(12) United States Patent
Diamond et al.

(10) Patent No.: US 11,458,871 B2
(45) Date of Patent: Oct. 4, 2022

(54) SEAT COVER

(71) Applicant: Plasticolor Inc., Fullerton, CA (US)

(72) Inventors: Shawn A. Diamond, Fullerton, CA (US); Eric M. Peterson, Fullerton, CA (US)

(73) Assignee: Plasticolor Molded Products Inc., Fullerton, CA (US)

( * ) Notice: Subject to any disclaimer, the term of this patent is extended or adjusted under 35 U.S.C. 154(b) by 0 days.

(21) Appl. No.: 15/841,151

(22) Filed: Dec. 13, 2017

(65) Prior Publication Data

US 2019/0031064 A1    Jan. 31, 2019

Related U.S. Application Data

(60) Provisional application No. 62/538,558, filed on Jul. 28, 2017.

(51) Int. Cl.
*B60N 2/60*    (2006.01)

(52) U.S. Cl.
CPC .................. *B60N 2/6036* (2013.01)

(58) Field of Classification Search
CPC ............ B60N 2/60; B60N 2/6036; B60N 2/6018–6027; B60N 2/6045–609; B60N 2/882
See application file for complete search history.

(56) References Cited

U.S. PATENT DOCUMENTS

| | | | | |
|---|---|---|---|---|
| 3,892,440 A * | 7/1975 | Dudley | .................... | B60H 1/00 297/229 |
| 4,232,898 A * | 11/1980 | Bodrero | .............. | B60N 2/6027 297/224 |
| 4,396,227 A * | 8/1983 | Neilson | .................. | B60N 2/609 297/228.11 |
| 5,618,082 A * | 4/1997 | Jachmich | ............... | A47C 31/11 297/219.1 |
| 5,803,539 A * | 9/1998 | Dewar | ................. | B60N 2/6054 297/228.1 |
| 6,079,784 A * | 6/2000 | Peachey | ............... | B60N 2/6036 297/284.5 |
| 6,666,509 B2 * | 12/2003 | Matsushima | ............ | B60N 2/80 297/219.1 |
| 6,817,664 B1 * | 11/2004 | Tang | .................... | B60N 2/5825 297/219.1 |
| 7,303,237 B1 * | 12/2007 | Hughes | .................. | B60N 2/882 297/391 |

(Continued)

*Primary Examiner* — David R Dunn
*Assistant Examiner* — Tania Abraham
(74) *Attorney, Agent, or Firm* — Stradling Yocca Carlson & Rauth

(57) ABSTRACT

Seat covers for a seat with a headrest are disclosed. The design includes a seat cover for a seat having a headrest, including a backrest cover sized to at least partially cover a backrest of the seat, an opening disposed on the backrest cover sized to allow the headrest to pass therethrough, and a flap sized to cover the opening and that is transitionable between a closed position and an open position. The opening is sized similar to the flap and the backrest cover has a securable slit provided therein. The flap in the open position and the slit in an unsecured orientation enables the seat cover to fit over the headrest, and the flap can be closed under the headrest and the securable slit secured to form a closed orientation.

14 Claims, 26 Drawing Sheets

(56) References Cited

U.S. PATENT DOCUMENTS

| | | | | |
|---|---|---|---|---|
| 7,568,762 | B2 * | 8/2009 | Paulson | B60N 2/28 297/219.12 |
| 8,657,373 | B2 * | 2/2014 | Miles | B60N 2/60 297/228.1 |
| D716,585 | S * | 11/2014 | Peterson | D6/611 |
| 9,045,067 | B2 * | 6/2015 | Long | B60N 2/6036 |
| 9,302,603 | B1 * | 4/2016 | Knight | B60N 2/6045 |
| 9,403,462 | B2 * | 8/2016 | Spitzer | A47C 31/11 |
| 2008/0079297 | A1 * | 4/2008 | Braxton Perry | B60N 2/28 297/219.12 |
| 2008/0179926 | A1 * | 7/2008 | Kushner | A47C 31/11 297/220 |
| 2012/0200130 | A1 * | 8/2012 | Brinker | A47C 31/11 297/220 |
| 2015/0102645 | A1 * | 4/2015 | Rogan | A47C 31/11 297/228.11 |
| 2017/0253159 | A1 * | 9/2017 | Lopatin | B60N 2/6063 |

* cited by examiner

FIG. 4
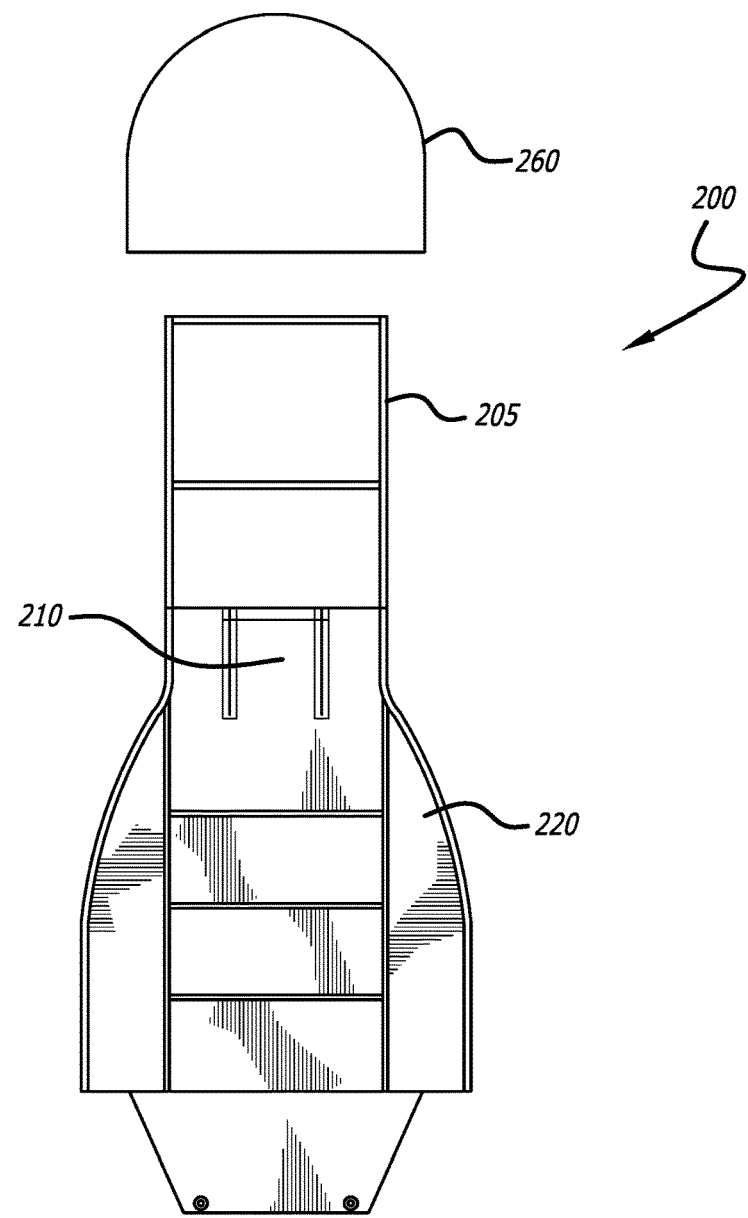
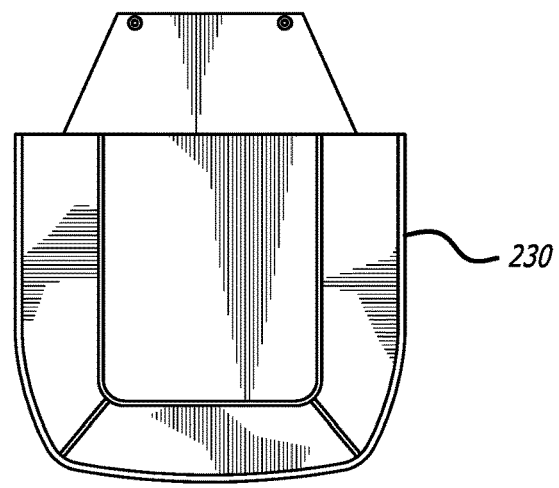

SEAT COVER

The present application claims the benefit of U.S. Provisional Patent Application Ser. No. 62/538,558, filed Jul. 28, 2017, inventors Shawn A. Diamond et al., entitled "Seat Cover," the entirety of which is incorporated herein by reference.

BACKGROUND OF THE INVENTION

Field of the Invention

The present invention relates to the art of seat covers.

Description of the Related Art

The following description includes information that may be useful in understanding the present invention. It is not an admission that any of the information provided herein is prior art or relevant to the presently claimed invention.

Various seat cover configurations are known for covering and protecting the surfaces of a seat, as well as for providing additional cushion and comfort. One example is U.S. Pat. No. 6,817,664 to Tang, describing an automobile seat cover installed over existing automobile seats. U.S. Pat. No. 7,607,732 to Beroth describes a one-piece seat cover for an existing aircraft seat. One drawback of seat covers having these types of construction is the failure to cover the back side of the seat.

Another design for a seat cover is shown in U.S. Pat. No. D716,585 to Peterson. Designs of this type provide some coverage of the backside of the seat, but the headrest of the seat must be removed to install the seat cover. Removal of headrests in modern vehicles can cause the removal and in some cases severing of electronics and wiring that is employed in the headrest, which is undesirable.

It would therefore be advantageous to provide a seat cover design that overcomes issues with currently available seat cover designs.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Thus according to the present design, there is provided a seat cover for a seat having a headrest, comprising a backrest cover sized to at least partially cover a backrest of the seat, an opening disposed on the backrest cover sized to allow the headrest to pass therethrough, and a flap sized to cover the opening and that is transitionable between a closed position and an open position. The opening is sized similar to the flap and the backrest cover has a securable slit provided therein. The flap in the open position and the slit in an unsecured orientation enables the seat cover to fit over the headrest, and the flap can be closed under the headrest and the securable slit secured to form a closed orientation.

According to a further aspect of the present design, there is provided a seat cover for a seat having a headrest. The seat cover comprises a backrest cover dimensioned to at least partially cover a backrest of the seat, a first opening disposed on the backrest cover comprising a flap dimensioned to cover the first opening, wherein the flap has an open position and a closed position, and a slit disposed on the backrest cover adjacent to the first opening that opens to form a second opening. The first opening and second opening are dimensioned to allow the headrest to pass therethrough when the flap is in the open position and the slit is opened to form the second opening.

According to another aspect of the present design, there is provided a seat cover for use with a backrest of a seat, comprising a backrest cover sized to fit the backrest of the seat, the backrest cover comprising an openable and closable flap, wherein when opened the seat cover includes a flap opening and a slit formed adjacent the flap opening. Opening the flap and the slit enables the seat cover to be installed over a headrest provided with the seat, the flap is closable under the headrest, and the slit is closable.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 4 is a front view of seat cover with an opening.

DETAILED DESCRIPTION

One should appreciate that the disclosed techniques provide many advantageous technical effects including providing mattress system for foldout beds that provides easy maintenance of the mattress and beddings for users of the foldout beds.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present design provides systems, devices and methods for securing a seat cover to a seat having a head rest. In one embodiment, the seat cover comprises a backrest cover sized and dimensioned to at least partially cover a backrest of the seat. The backrest cover has an opening disposed that is sized and dimensioned to allow the headrest to pass there through, and a flap that is sized and dimensioned to cover the opening. The flap is transitionable between a covered position and an uncovered position, or a closed position and an open position. The seat cover may further include a bottom cover that is sized and dimensioned to at least partially cover a bottom portion of the seat. and a headrest cover that is sized and dimensioned to at least partially cover the headrest of the seat.

In one aspect, the width of the flap is small enough to fit between the two posts on a headrest. In addition, the flap can be held in the closed position using hook-and-loop fasteners across edges of the opening.

In yet other aspects, the backrest cover can further include a slit disposed adjacent to the edge of the flap, wherein the slit opens to form a second opening. The first opening from the slap and second opening from the slit are sized and dimensioned to allow a headrest to pass therethrough, and in practice virtually any size headrest currently on the market can be accommodated. In some embodiments, the first opening can be a square or rectangular shape, and the second opening can be triangular.

Figure 1:
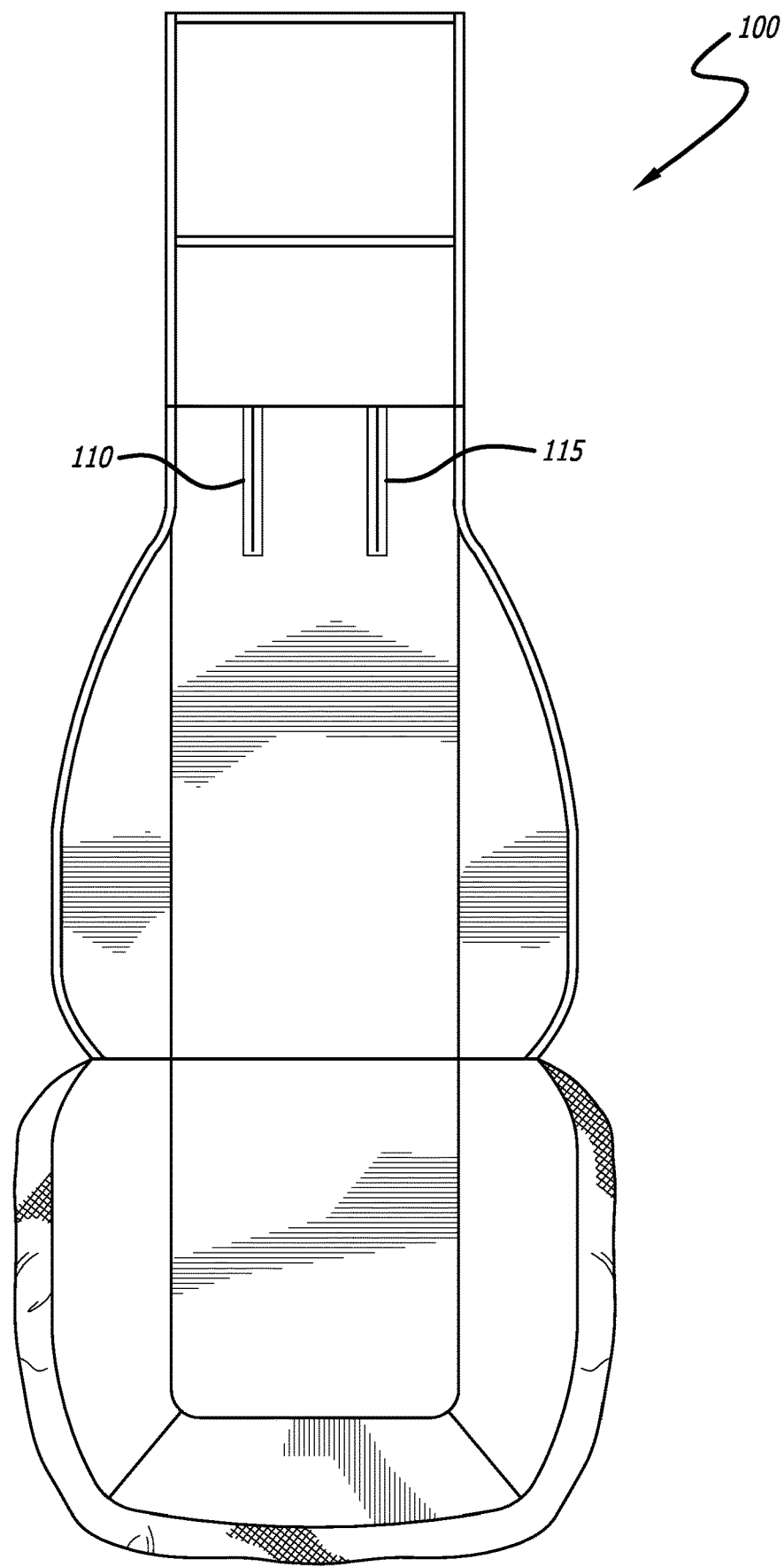
FIG. 1 is a front view of a seat cover.

FIG. 1 is a front view of a seat cover 100. Seat cover 100 is sized and dimensioned to cover a bottom portion and backrest portion of a seat. Seat cover 100 can be made of a material that protects the surface of the seat and provides cushion for comfort. The material is preferably flexible so that it can wrap around and conform to the seat.

Figure 2:
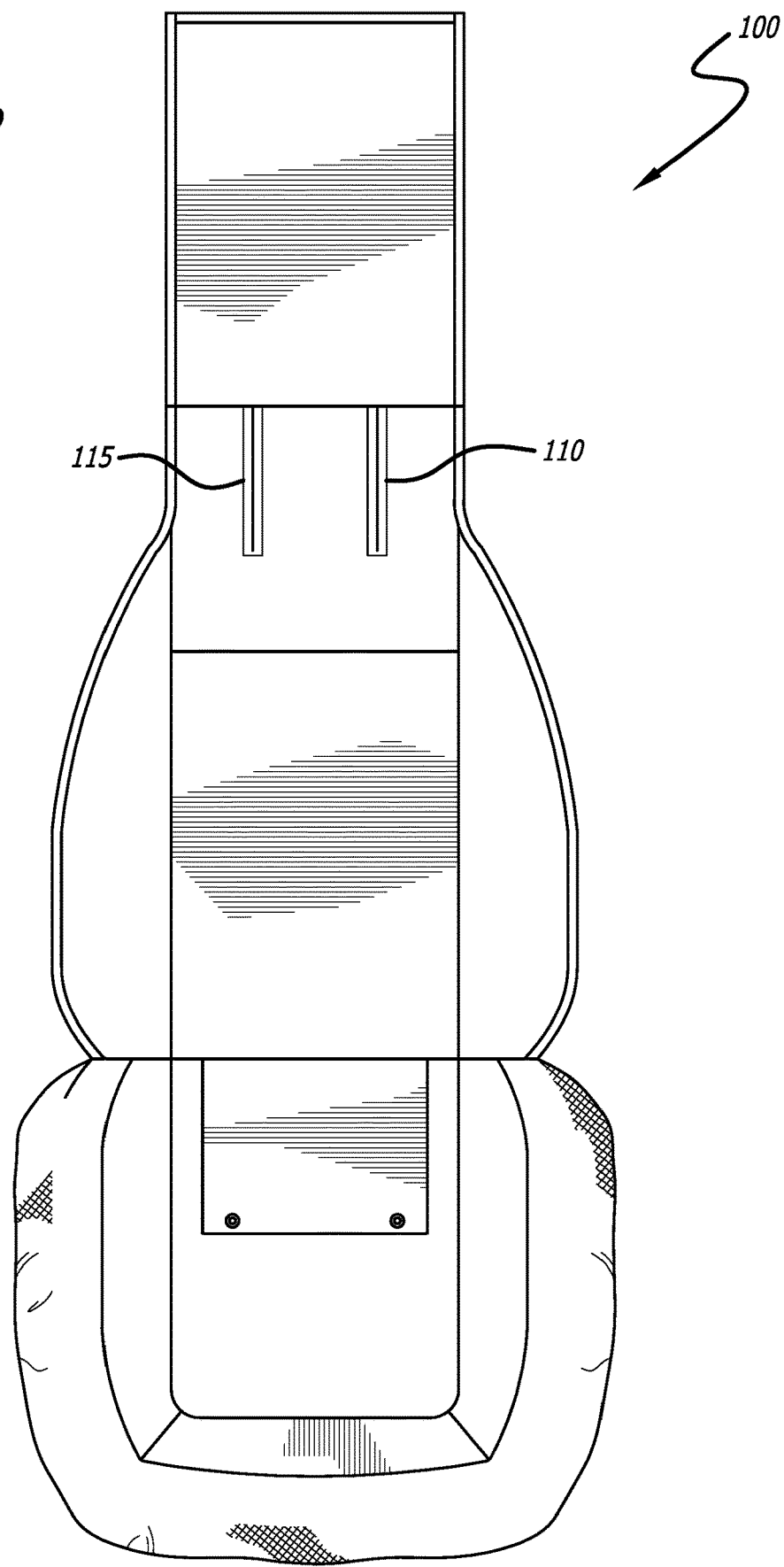
FIG. 2 is a rear view of the seat cover of FIG. 1.
Figure 3:
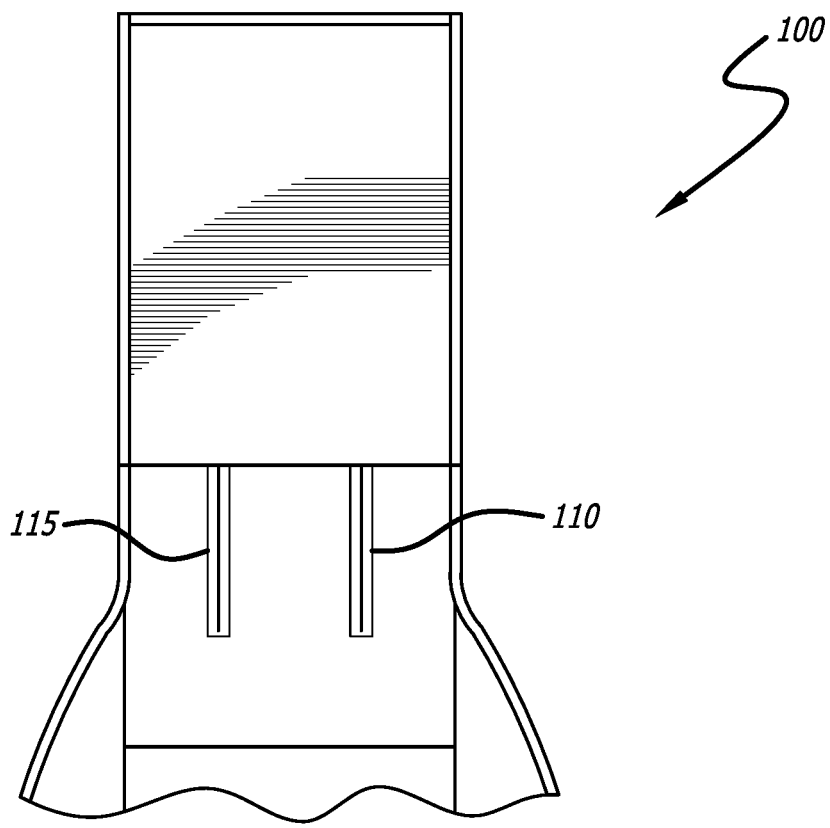
FIG. 3 is a close-up view of FIG. 2.

Seat cover 100 also has a first slit 110 and a second slit 115. As used herein, "slit" means a narrow opening or cut. Slit 110 and slit 115 are sized and dimensioned to allow the headrest posts to pass there through and couple with the body of the seat (see, e.g. FIG. 12). FIG. 2 is a back view of the seat cover of FIG. 1. FIG. 3 is a close-up view of FIG. 2 and shows the elastic fabric straps that extend across slit 110 and slit 115 to keep them closed. To install seat cover 100 on a seat, the head rest of the seat must be removed first. Then seat cover 100 can be placed on the seat and secured to the seat (e.g., elastic straps). Finally, the headrest posts can be inserted through slit 110 and slit 115 and into the backrest.

Figure 5:
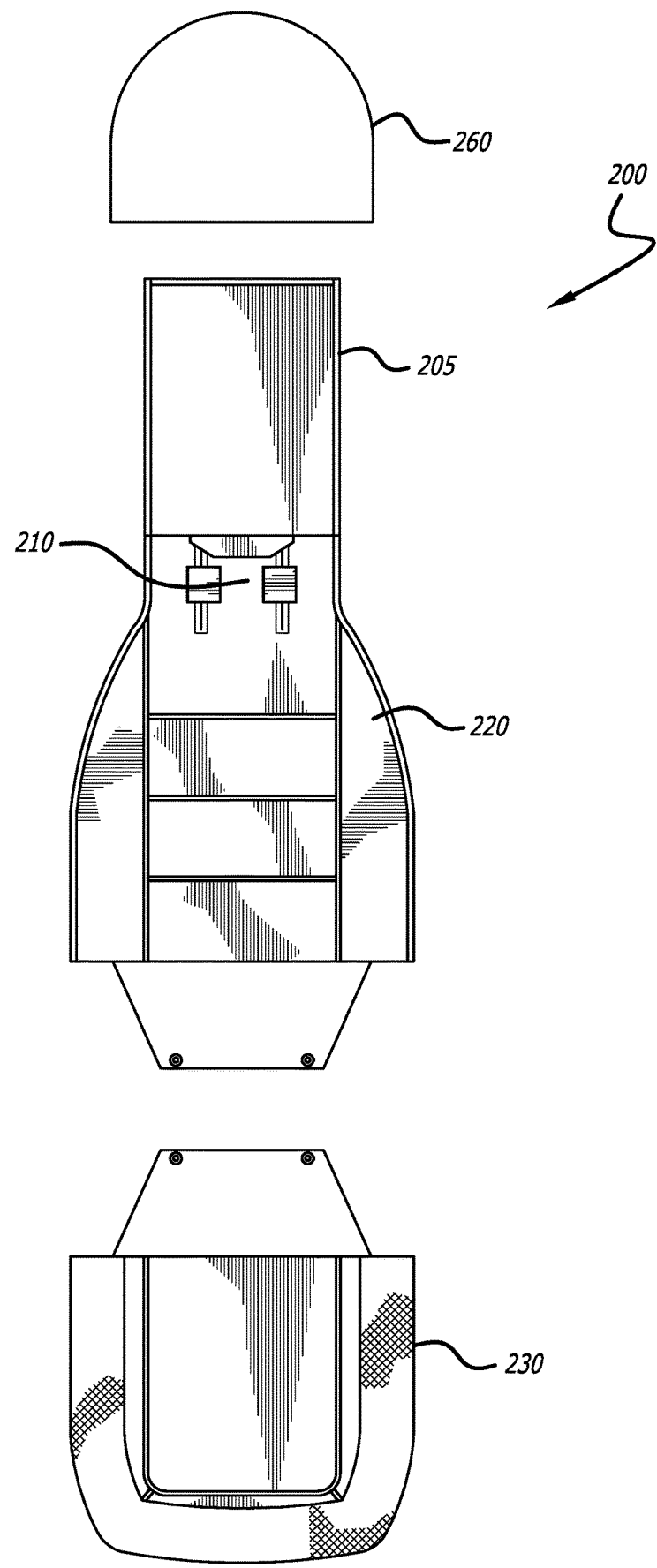
FIG. 5 is a back view of the seat cover of FIG. 4.

FIG. 4 is a front view of a seat cover 200 and FIG. 5 is a back view of seat cover 200. Seat cover 200 comprises a bottom cover 230, a backrest cover 220, and optionally a headrest cover 260. Bottom cover 230 is sized and dimensioned to cover a bottom portion of a seat. Bottom cover 230 has an elastic fabric region that wraps around and secures to the seat. Backrest cover 220 is sized and dimensioned to cover the backrest portion of the seat. Bottom cover 230 and backrest cover 220 have a pair of buttons that cooperate so as to allow the bottom cover 230 and backrest cover 220 to couple together. Bottom cover 230 and backrest cover 220 can be made of a material that protects the surface of the seat and provides cushion for comfort. The material is preferably flexible so that it can wrap around and conform to the seat.

Figure 6:
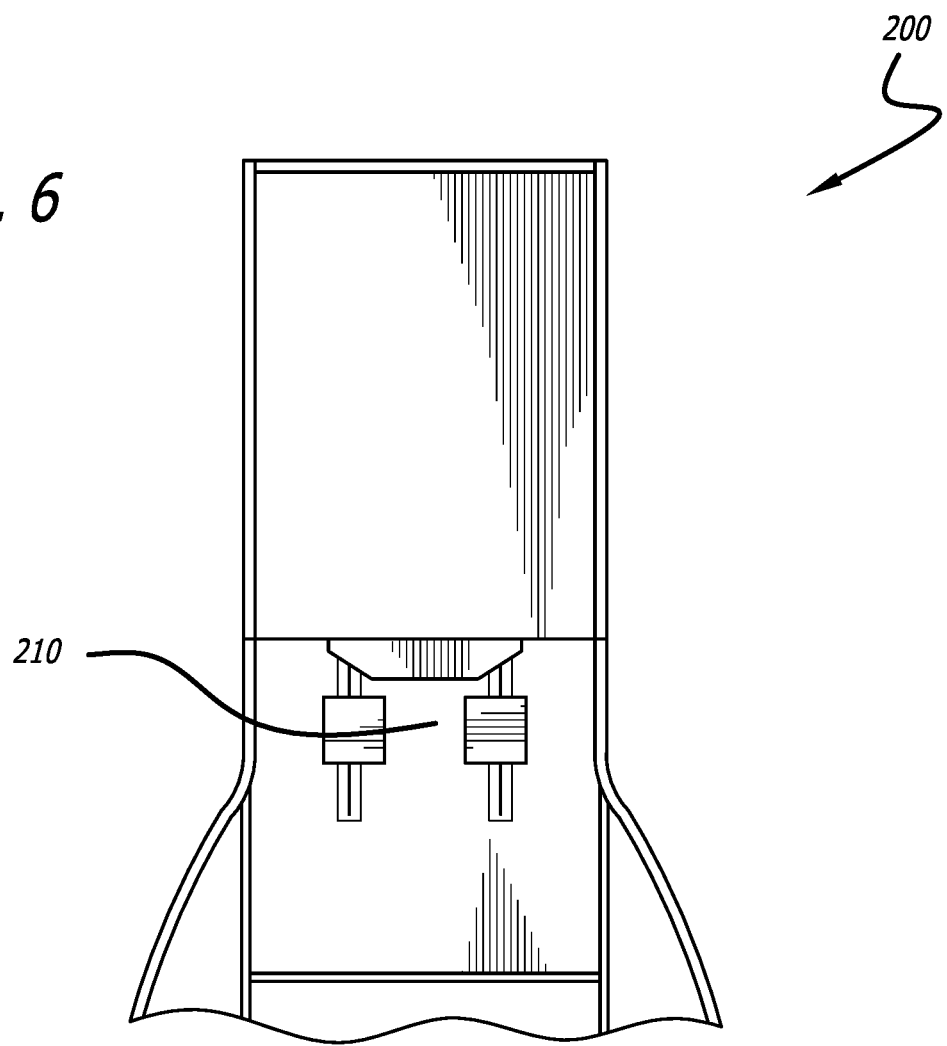
FIG. 6 is a close-up view of FIG. 5.

Backrest cover 220 has a flap 210 that folds open to create an opening. FIG. 6 is a close-up view of the backside of flap 210. The opening has three sides that define a rectangular or square shaped opening. The opening is sized and dimensioned to allow a headrest of a seat to pass through. Flap 210 also has several hook and loop fasteners around its edges to keep flap 210 in the closed position.

Figure 7:
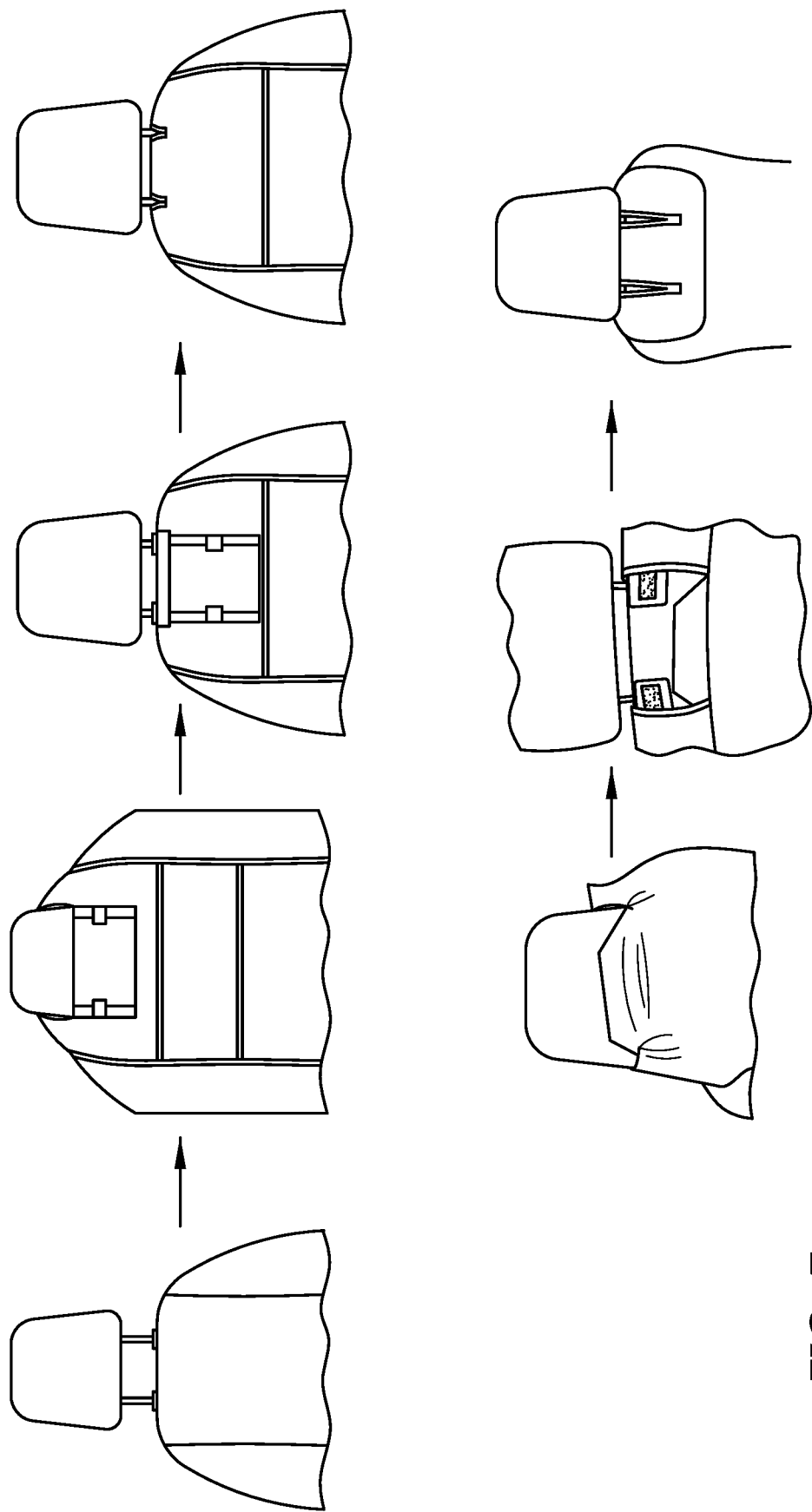
FIG. 7 shows installing the seat cover of FIG. 4 on a seat.

FIG. 7 shows the steps of installing seat cover 200 on a seat. Unlike seat cover 100, seat cover 200 can be installed on a seat without removing the headrest. First, flap 210 is opened. Second, the opening in backrest cover 220 is placed over the headrest. Third, backrest cover 220 is pulled down until the headrest passes through the opening. Fourth, flap 210 is placed between the headrest and backrest of the seat, and in between the two posts of the headrest. The installation further includes the steps of placing and securing bottom cover 230 to the bottom portion of the seat and coupled with backrest cover 220. Finally, headrest cover 260 can be optionally placed over the headrest.

Figure 8:
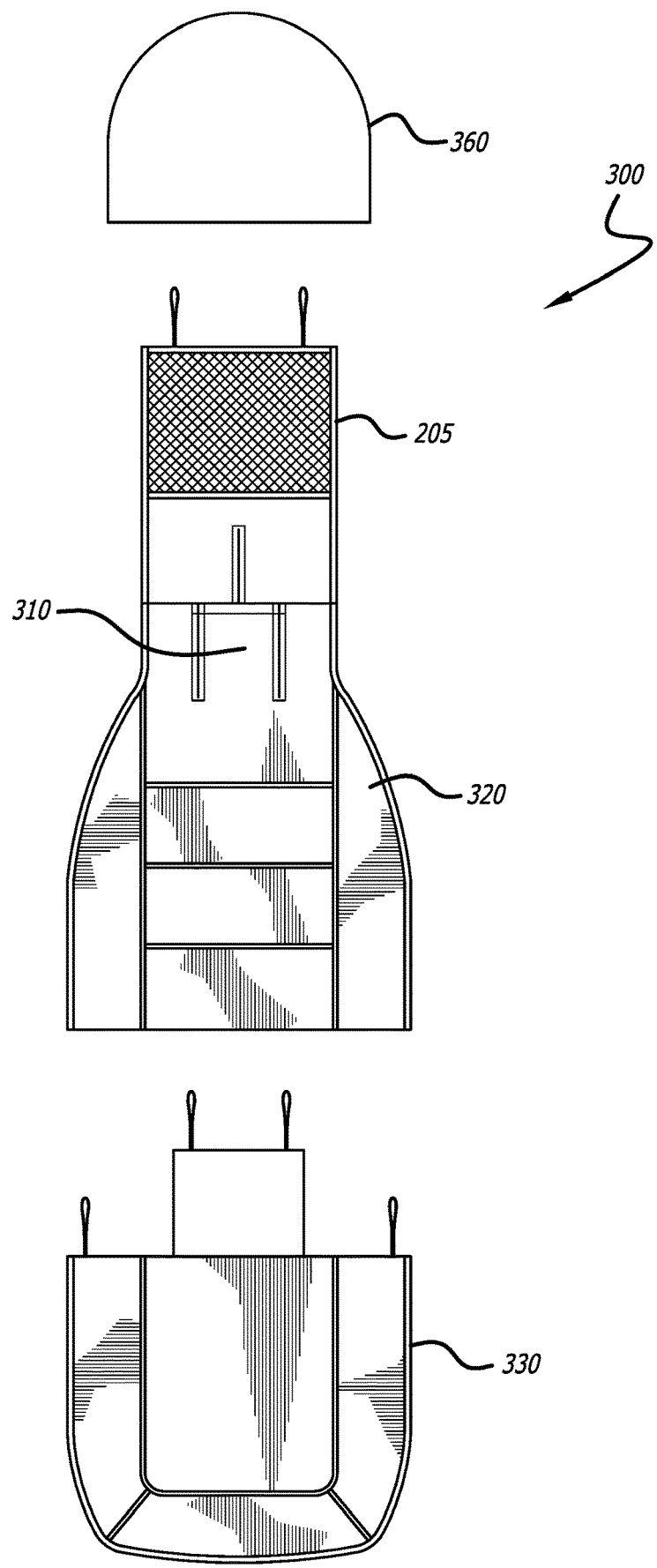
FIG. 8 is a front view of another seat cover with an opening.
Figure 9:
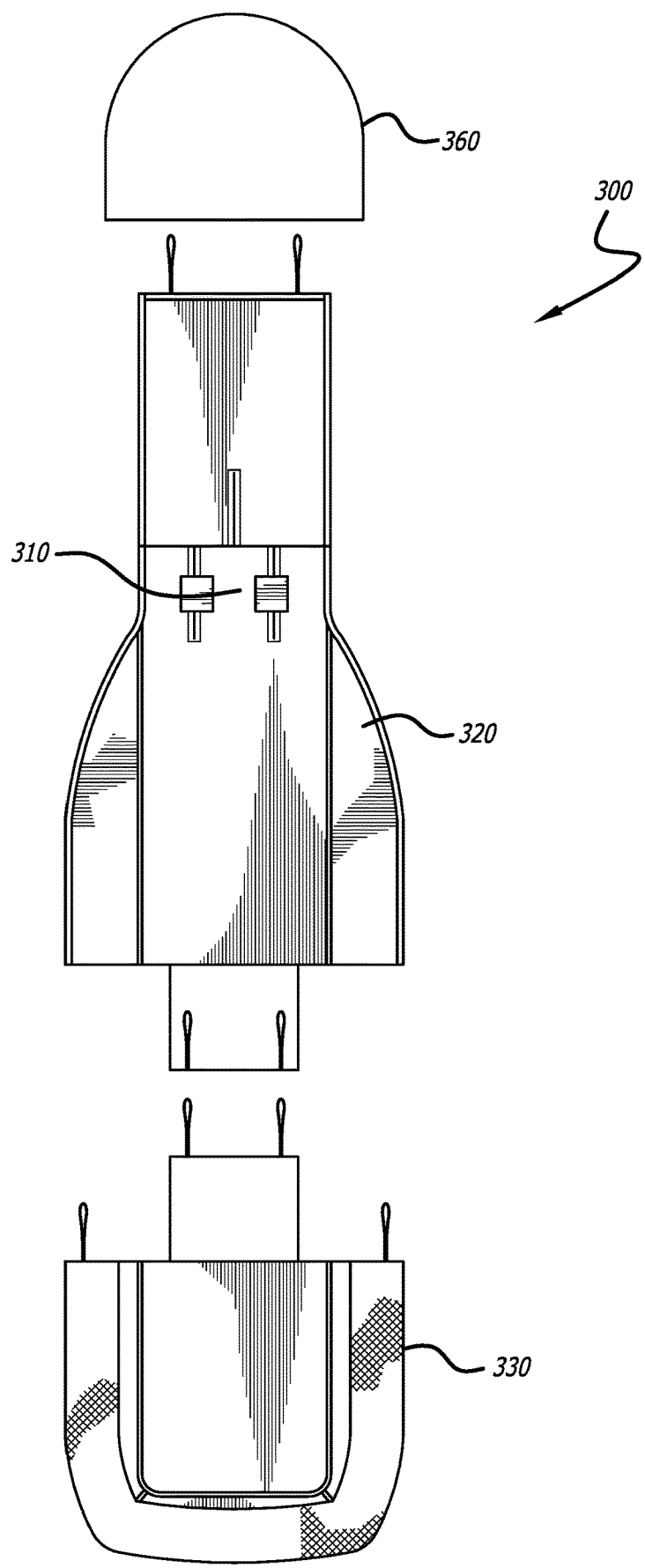
FIG. 9 is a back view of the seat cover of FIG. 8.

FIG. 8 is a front view of a seat cover 300 and FIG. 9 is a back view of seat cover 300 employing an additional slit 313 that facilitates putting the seat cover over virtually any type of headrests employing posts. From FIG. 8, seat cover 300 comprises a bottom cover 330, a backrest cover 320, and optionally a headrest cover 360. Bottom cover 330 is sized and dimensioned to cover a bottom portion of a seat. Bottom cover 330 has an elastic fabric region that wraps around and secures to the seat. Backrest cover 320 is sized and dimensioned to cover the backrest portion of the seat. Bottom cover 330 and backrest cover 320 have a pair of buttons that cooperate so as to allow the bottom cover 330 and backrest cover 320 to couple together. Bottom cover 330 and backrest cover 320 can be made of a material that protects the surface of the seat and provides cushion for comfort. The material is preferably flexible so that it can wrap around and conform to the seat.

Figure 10:
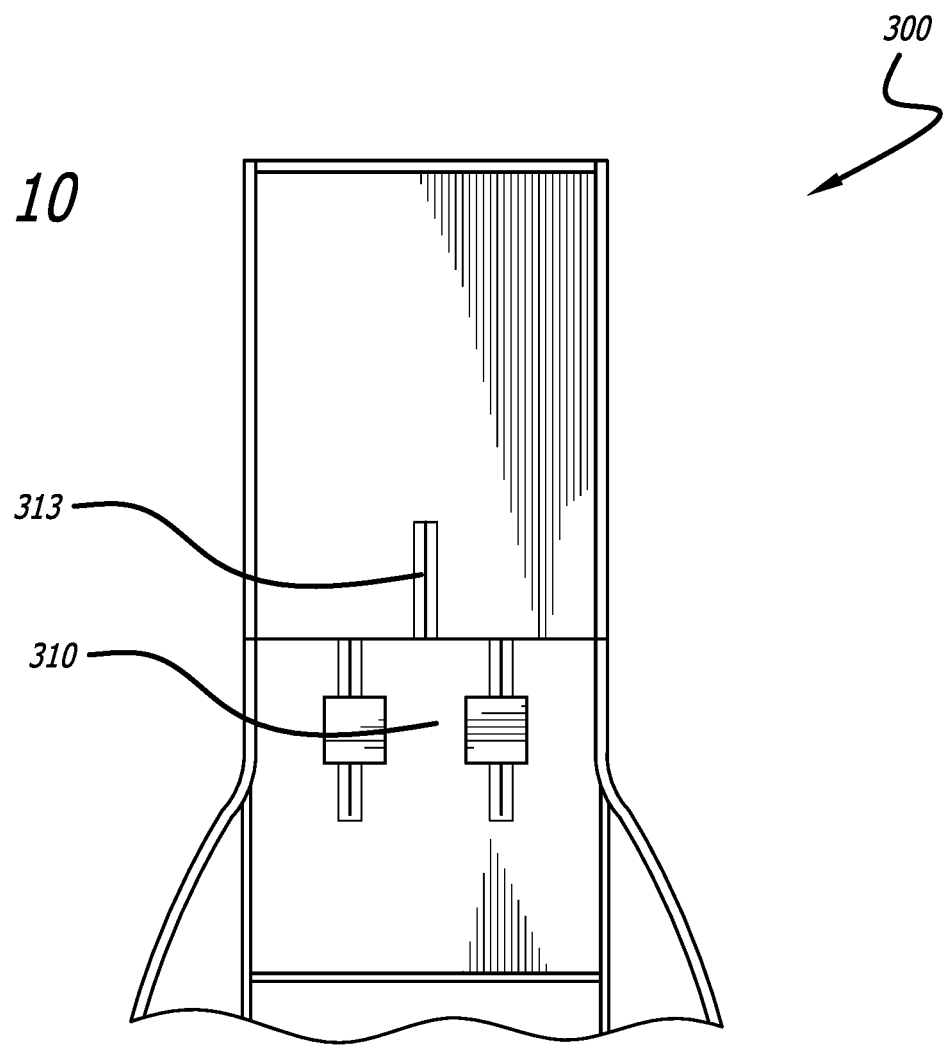
FIG. 10 is a close-up view of FIG. 9.

Backrest cover 320 has a flap 310 that folds open to create a first opening and a slit 313 that folds open to create a second opening next to the first opening. FIG. 10 is a close-up view of the backside of flap 310 and slit 313. The first opening formed by folding back flap 310 has three sides that define a rectangular or square shaped opening. The second opening formed by opening slit 313 creates a triangular shaped opening. Together, the first and second openings are sized and dimensioned to allow a headrest of a seat to pass through. Flap 310 and slit 313 also have several hook and loop fasteners around its edges to keep them in the closed position. In this manner, and using this construction, the seat cover can fit over current headrests employing posts without the need to remove the headrest and potentially harm any electronics provided in the posts and headrest.

Figure 11:
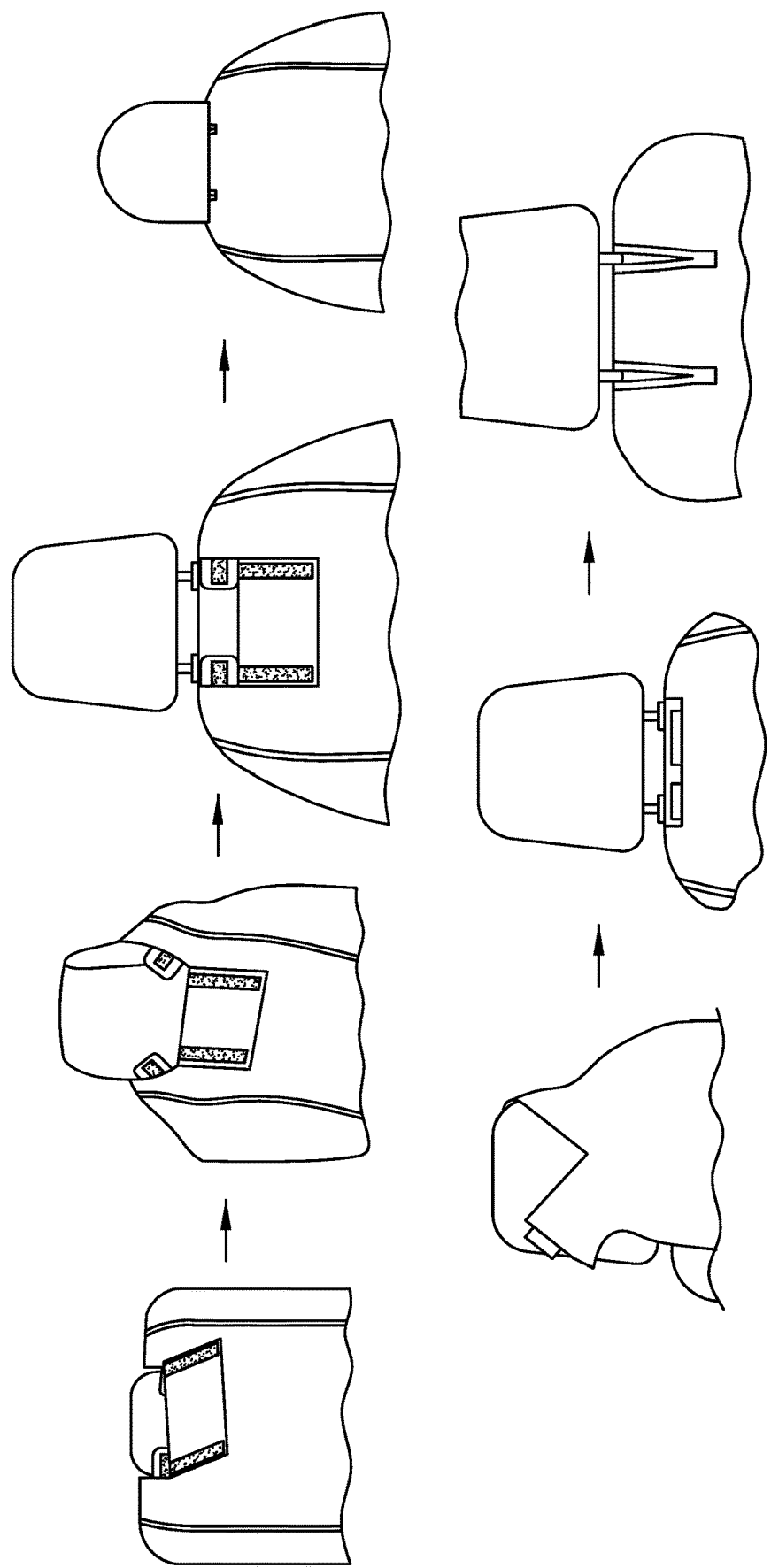
FIG. 11 shows installing the seat cover of FIG. 8 on a seat.

FIG. 11 shows the steps of installing seat cover 300 on a seat. Unlike seat cover 100, seat cover 300 can be installed on a seat without removing the headrest. First, flap 310 and slit 313 are opened. Second, the first and second openings in backrest cover 320 are placed over the headrest. Third, backrest cover 320 is pulled down until the headrest passes through the first and second openings. Fourth, flap 310 is placed between the headrest and backrest of the seat, and in between the two posts of the headrest in the closed position, and slit 313 is closed. The installation further includes the steps of placing and securing bottom cover 330 to the bottom portion of the seat and coupled with backrest cover 320. Finally, headrest cover 360 can be optionally placed over the headrest.

Figure 12A:
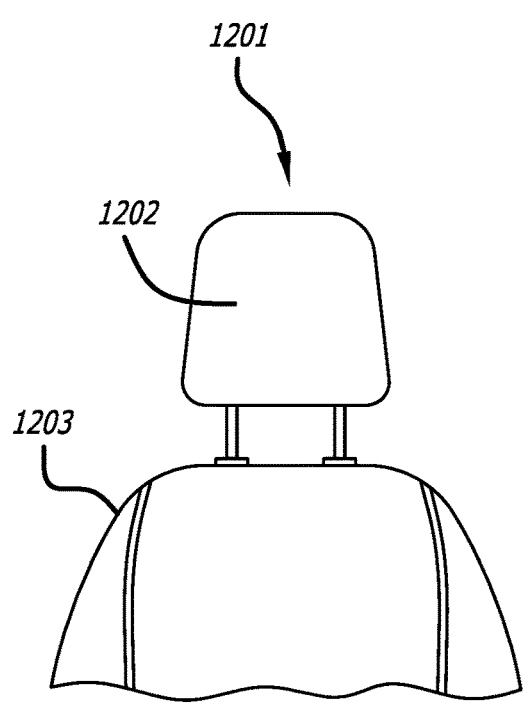
FIG. 12A is a view of a car seat with a headrest.
Figure 12B:
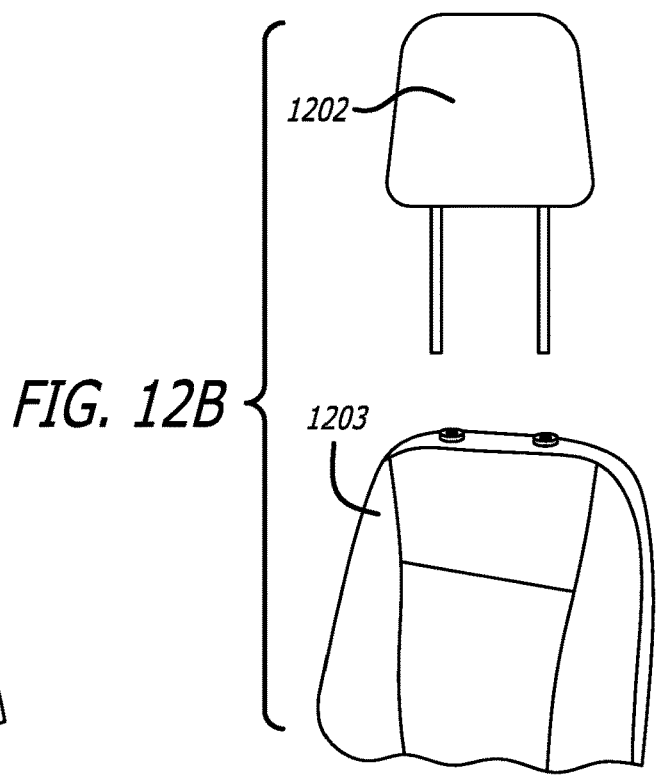
FIG. 12B is a view of a headrest separate from a view of a backrest.
Figure 12C:
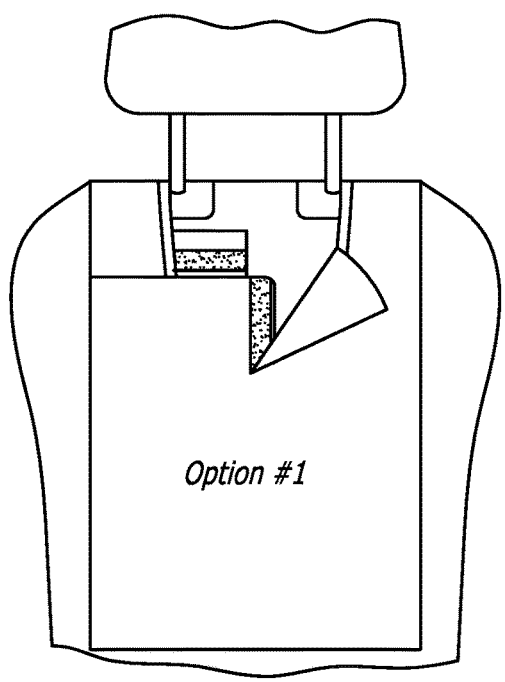
FIG. 12C illustrates a first (open) option for a rear slit provided in the seat cover.
Figure 12D:
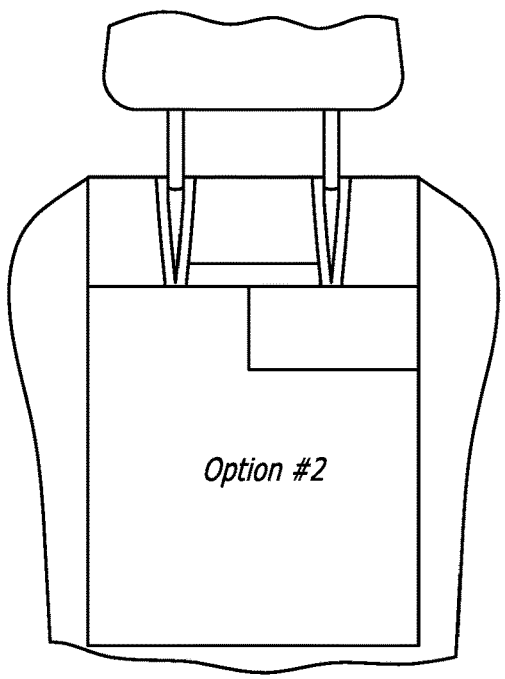
FIG. 12D is a second (closed) option for a rear slit provided in a seat cover.

FIG. 12A illustrates a car seat 1201, with headrest 1202 and backrest 1203. FIG. 12B similarly illustrates headrest 1202 and backrest 1203. FIG. 12C illustrates option 1, with a four inch (approximately) slit in the back, open in this configuration. FIG. 12D shows option 2, where a hook and loop closure, or Velcro closure, is employed to secure the slit and an overlap flap provided.

Figure 13:
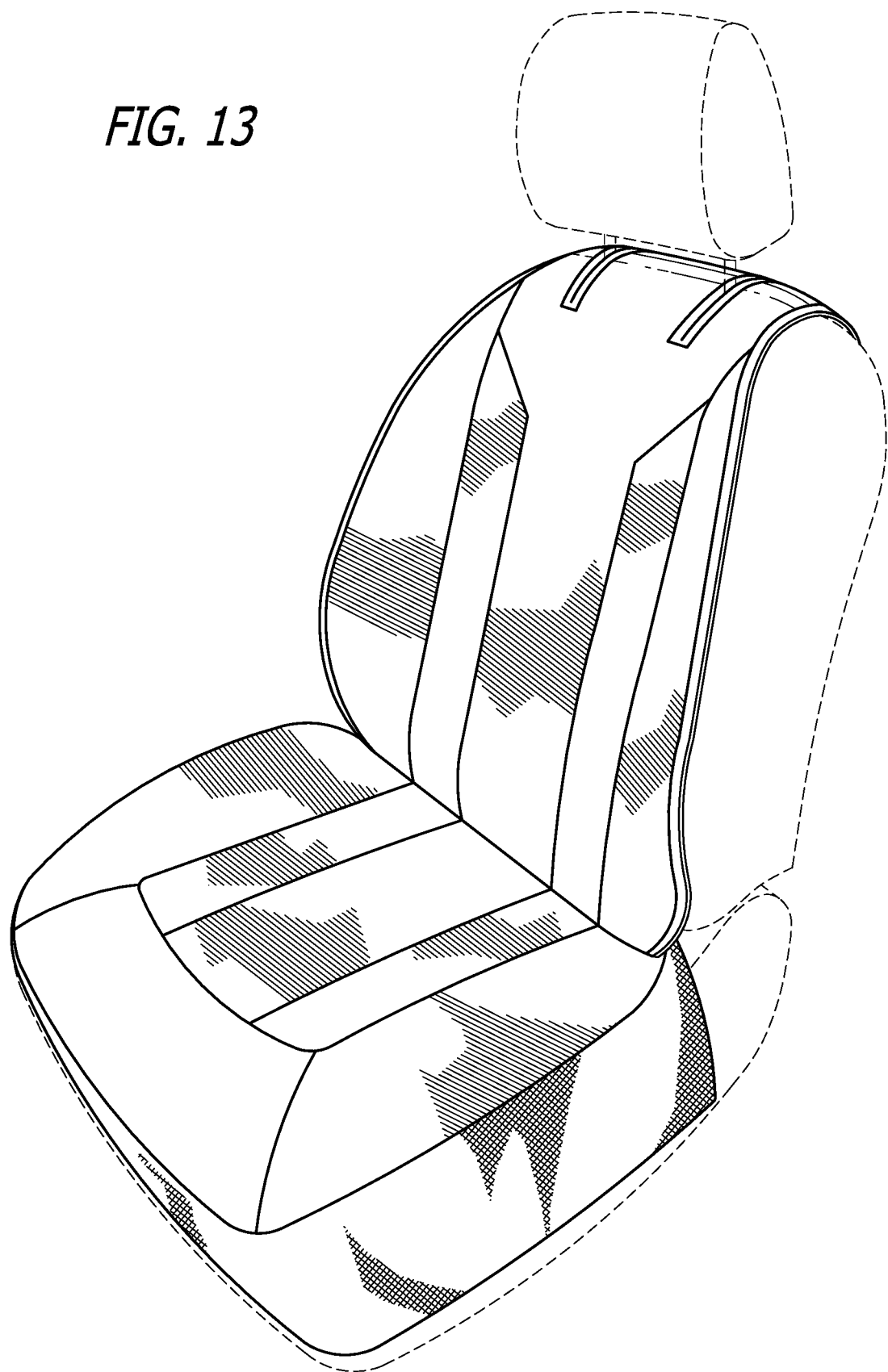
FIG. 13 is a top right perspective view showing the top, front, and right sides of a first alternate embodiment of the seat cover.
Figure 14:
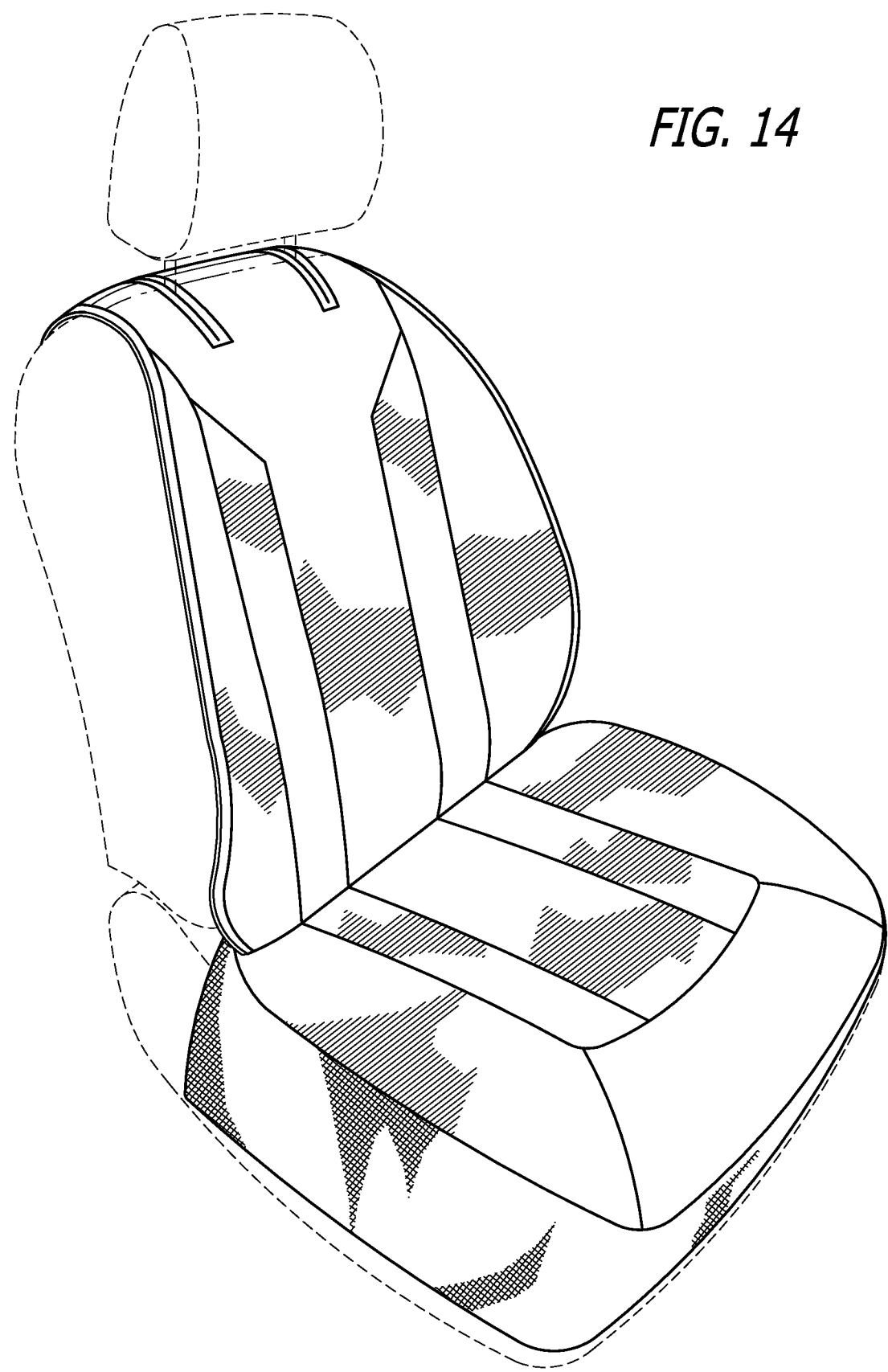
FIG. 14 is a top left perspective view showing the showing the top, front, and left sides of the first alternate embodiment of the seat cover.
Figure 15:
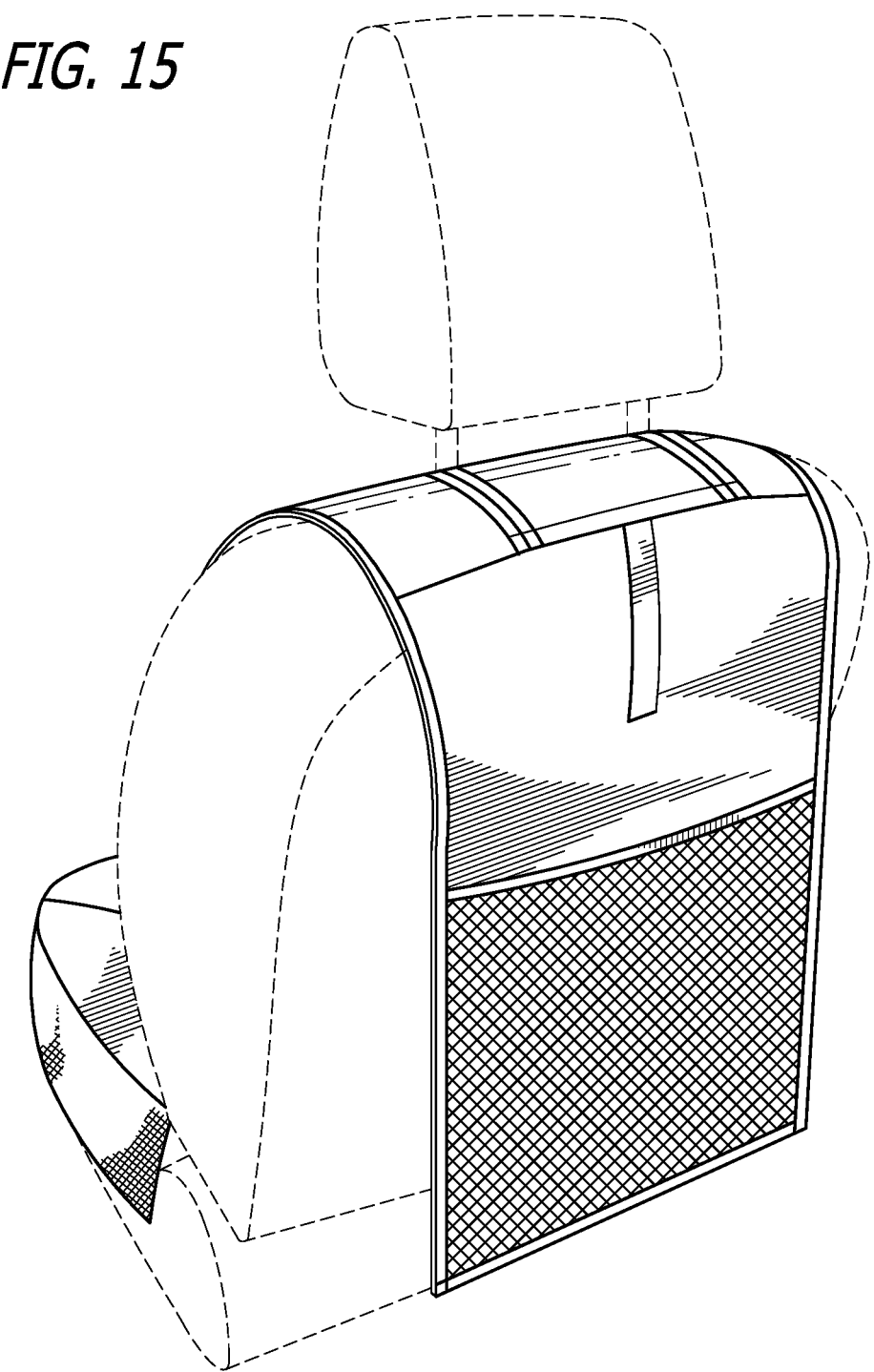
FIG. 15 is a left rear perspective view showing the back and a portion of the right side of the first alternate embodiment of the seat cover.
Figure 16:
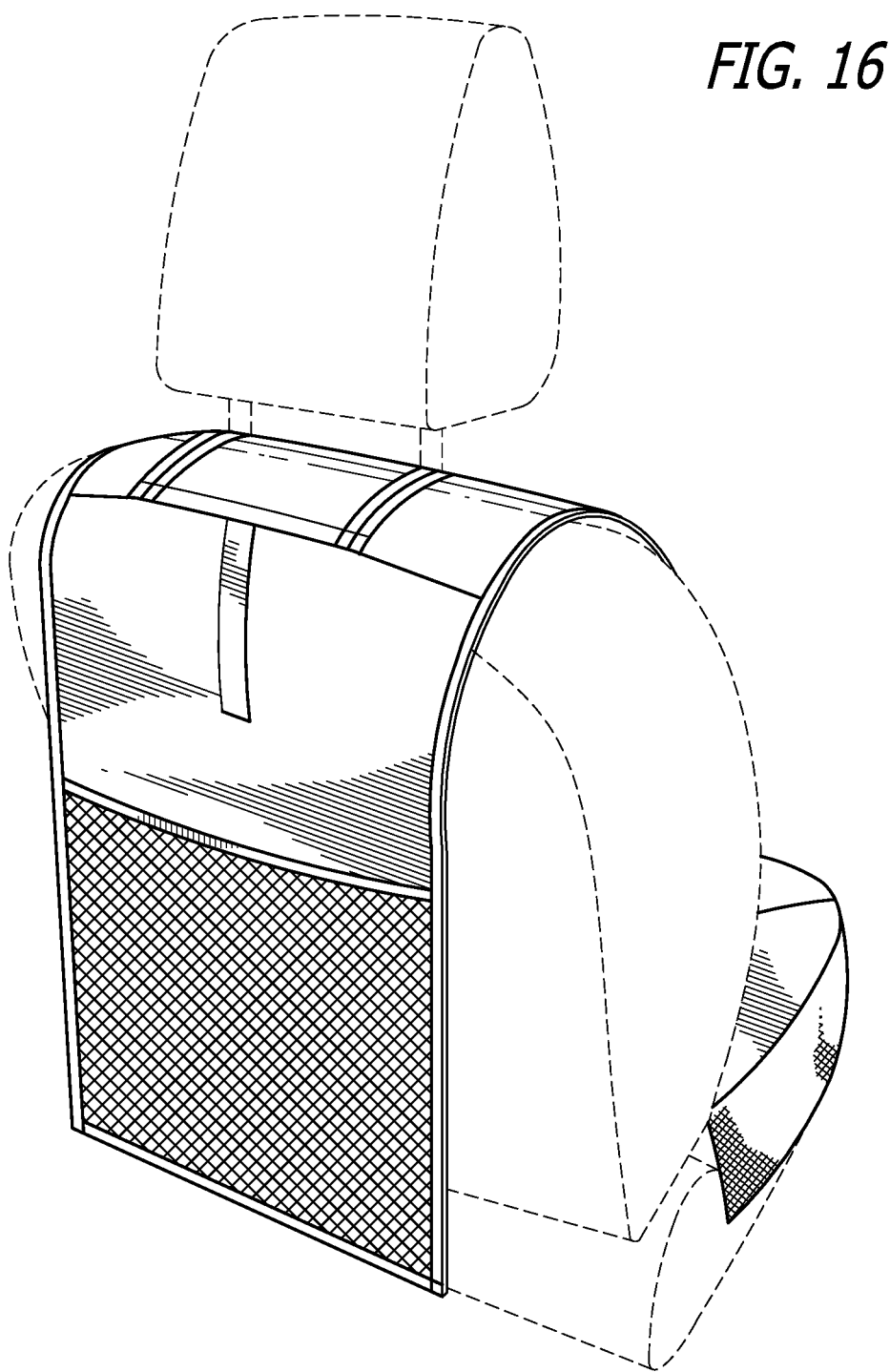
FIG. 16 is a right rear perspective view showing the back and a portion of the left side of the first alternate embodiment of the seat cover.
Figure 17:
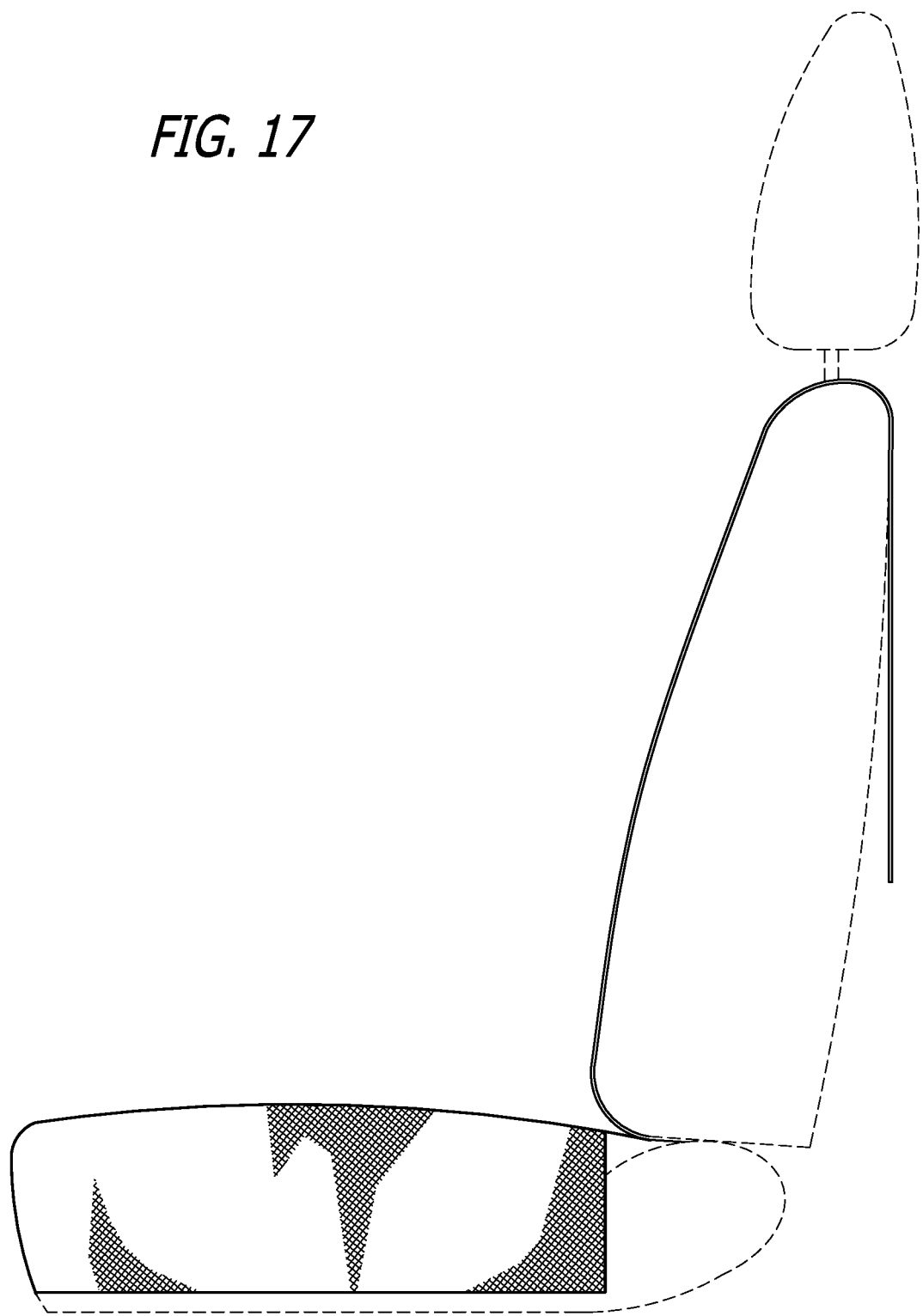
FIG. 17 is a right side elevation view of the first alternate embodiment of the seat cover.
Figure 18:
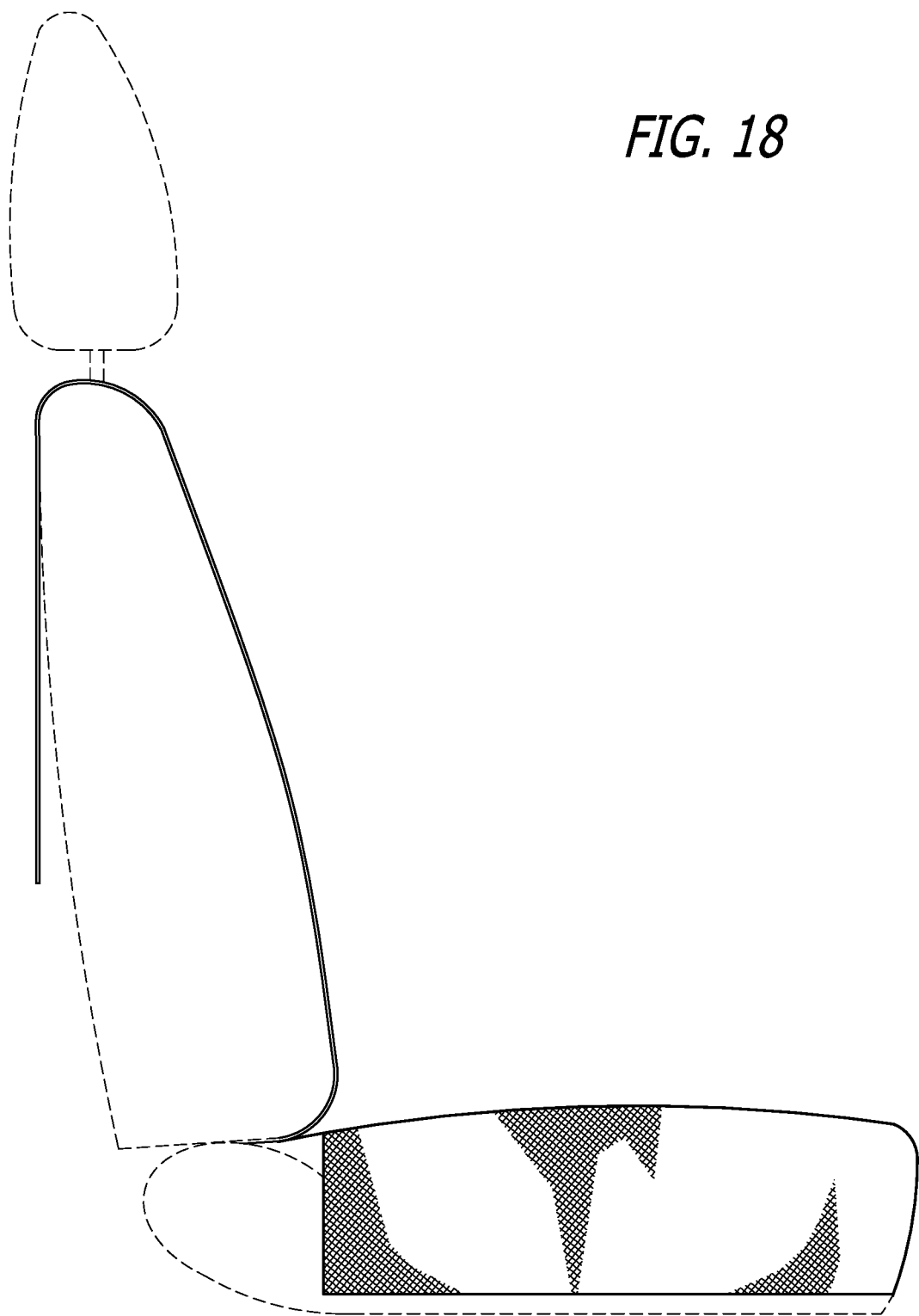
FIG. 18 is a left side elevational view of the first alternate embodiment of the seat cover.
Figure 19:
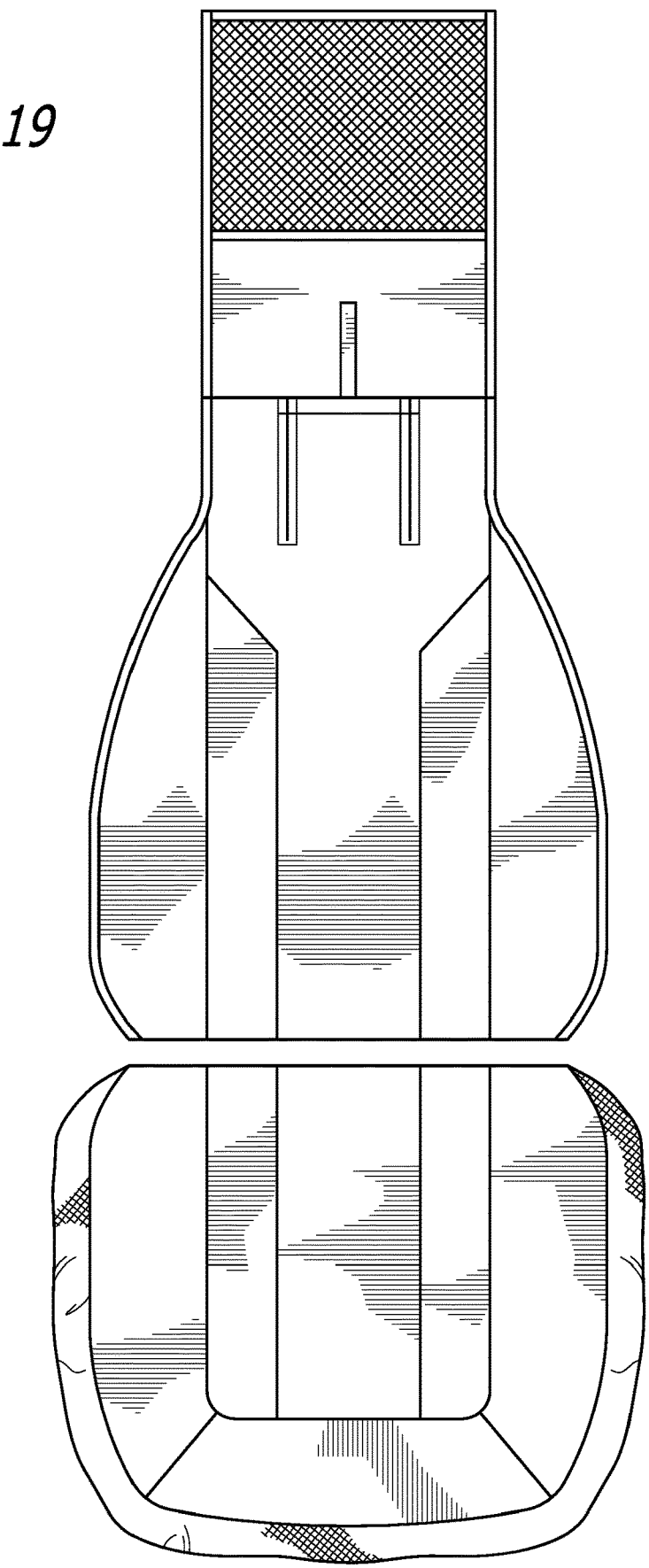
FIG. 19 is a front view of the first alternate embodiment of the seat cover in an unfolded, flat orientation.

FIGS. 13 through 19 illustrate a first alternate embodiment of the present seat cover design. FIG. 13 is a top right perspective view showing the top, front, and right sides of a first alternate embodiment of the seat cover. FIG. 14 is a top left perspective view showing the showing the top, front, and left sides of the first alternate embodiment of the seat cover. FIG. 15 is a left rear perspective view showing the back and a portion of the right side of the first alternate embodiment of the seat cover. FIG. 16 is a right rear perspective view showing the back and a portion of the left side of the first alternate embodiment of the seat cover. FIG. 17 is a right side elevation view of the first alternate embodiment of the seat cover. FIG. 18 is a left side elevational view of the first alternate embodiment of the seat cover, and FIG. 19 is a front view of the first alternate embodiment of the seat cover in an unfolded, flat orientation.

Figure 20:
FIG. 20 is a top right perspective view showing the top, front, and right sides of a second alternate embodiment of the seat cover.
Figure 21:
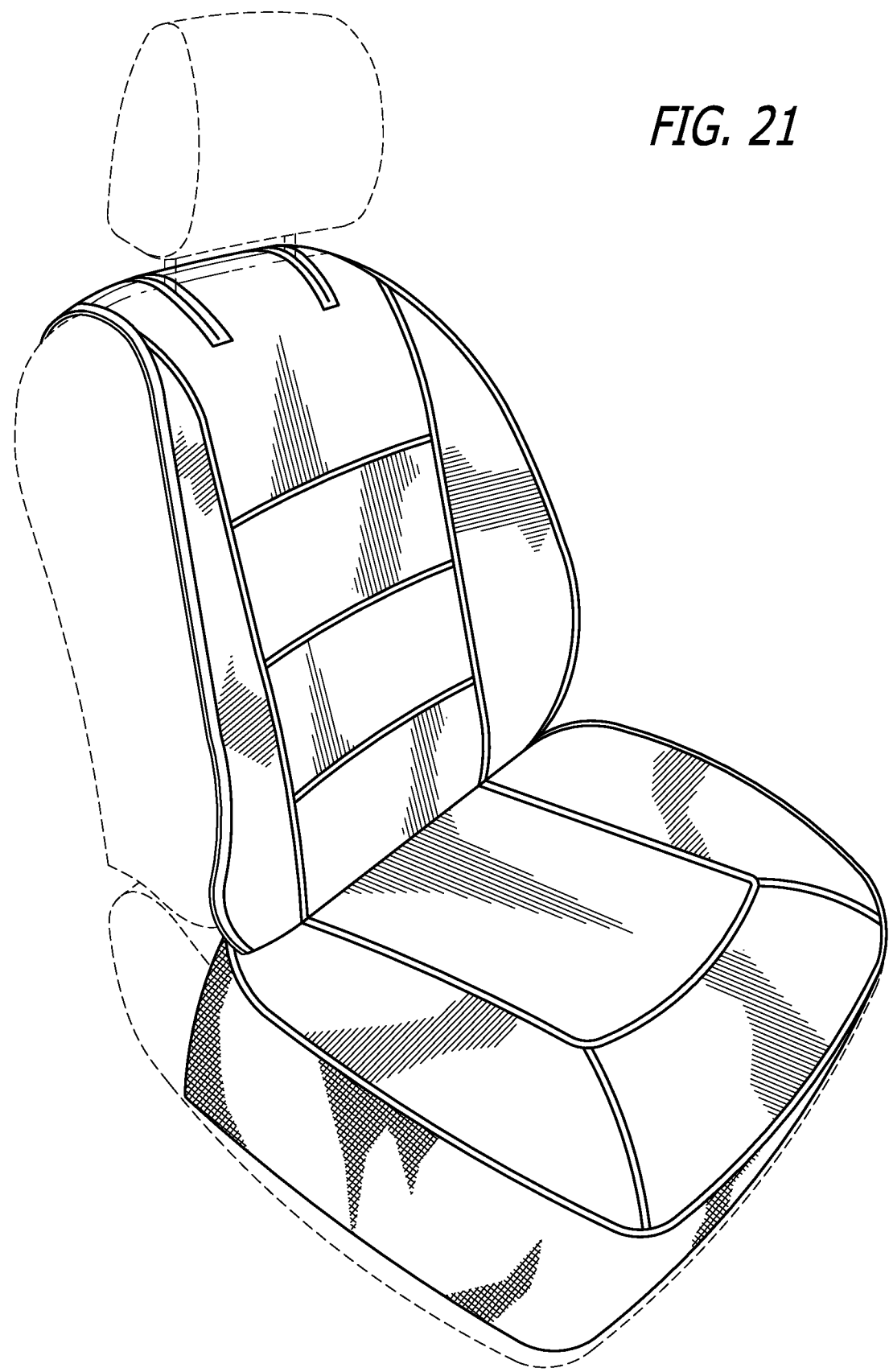
FIG. 21 is a top left perspective view showing the showing the top, front, and left sides of the second alternate embodiment of the seat cover.
Figure 22:
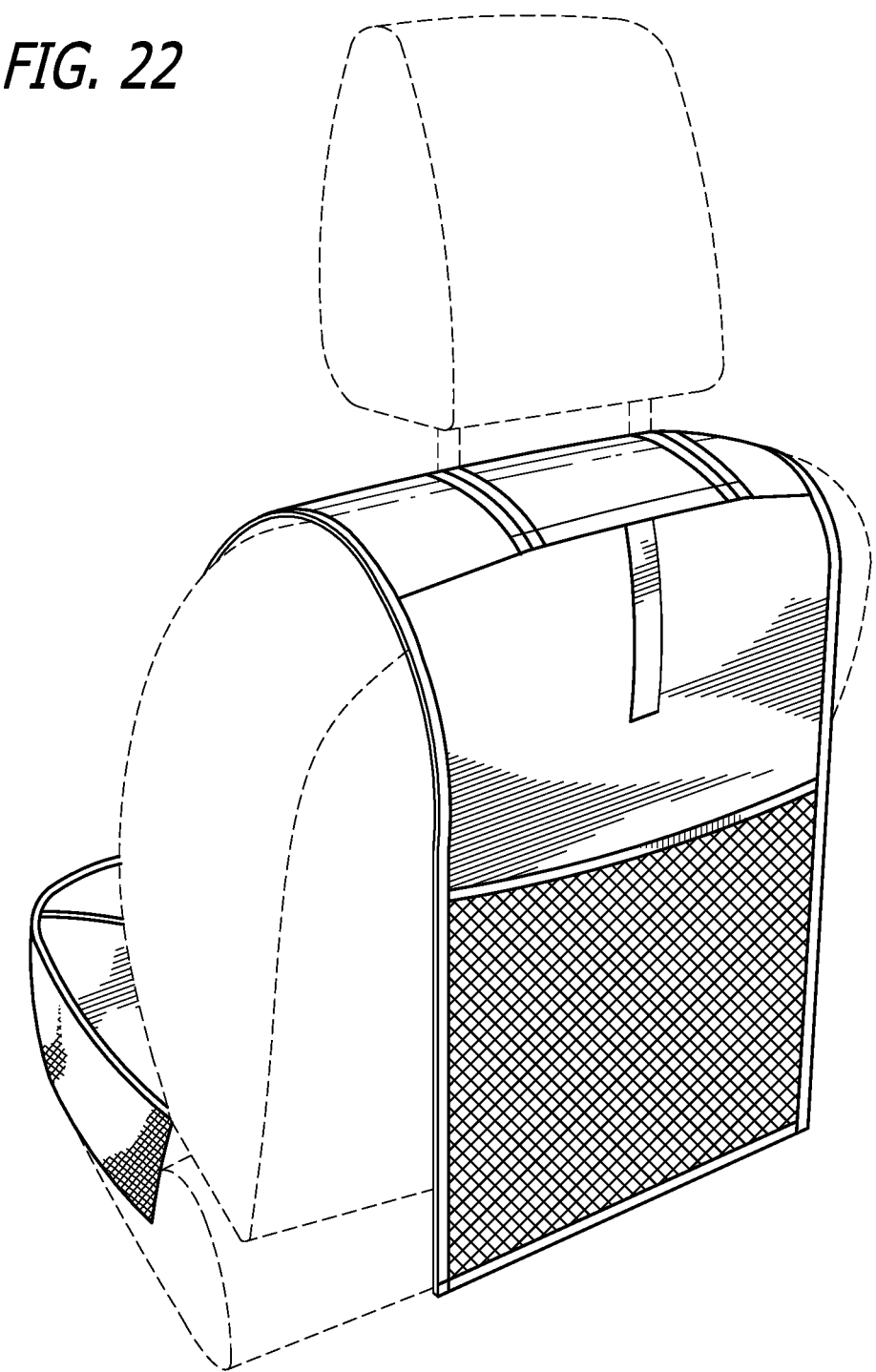
FIG. 22 is a left rear perspective view showing the back and a portion of the right side of the second alternate embodiment of the seat cover.
Figure 23:
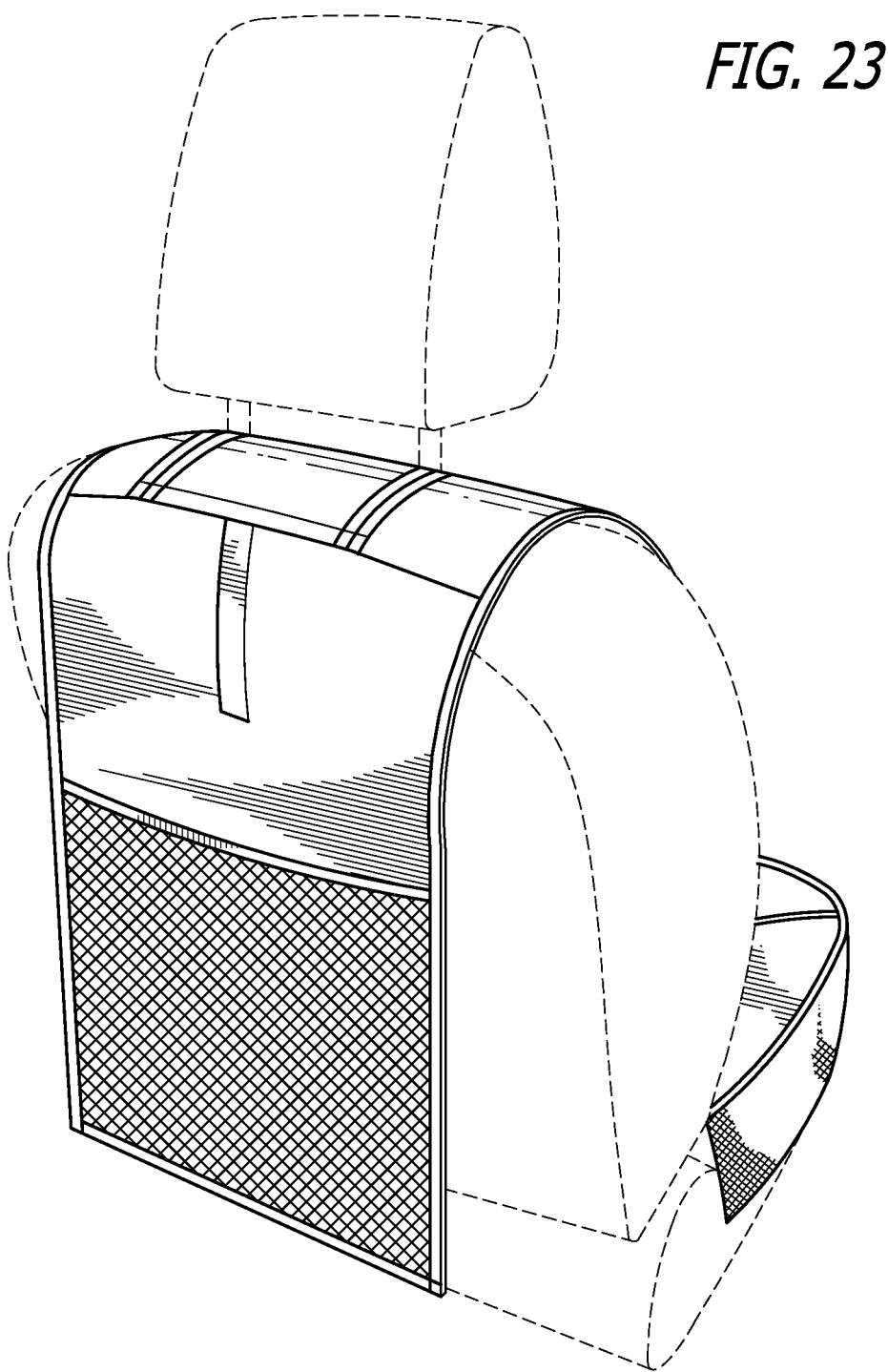
FIG. 23 is a right rear perspective view showing the back and a portion of the left side of the second alternate embodiment of the seat cover.
Figure 24:
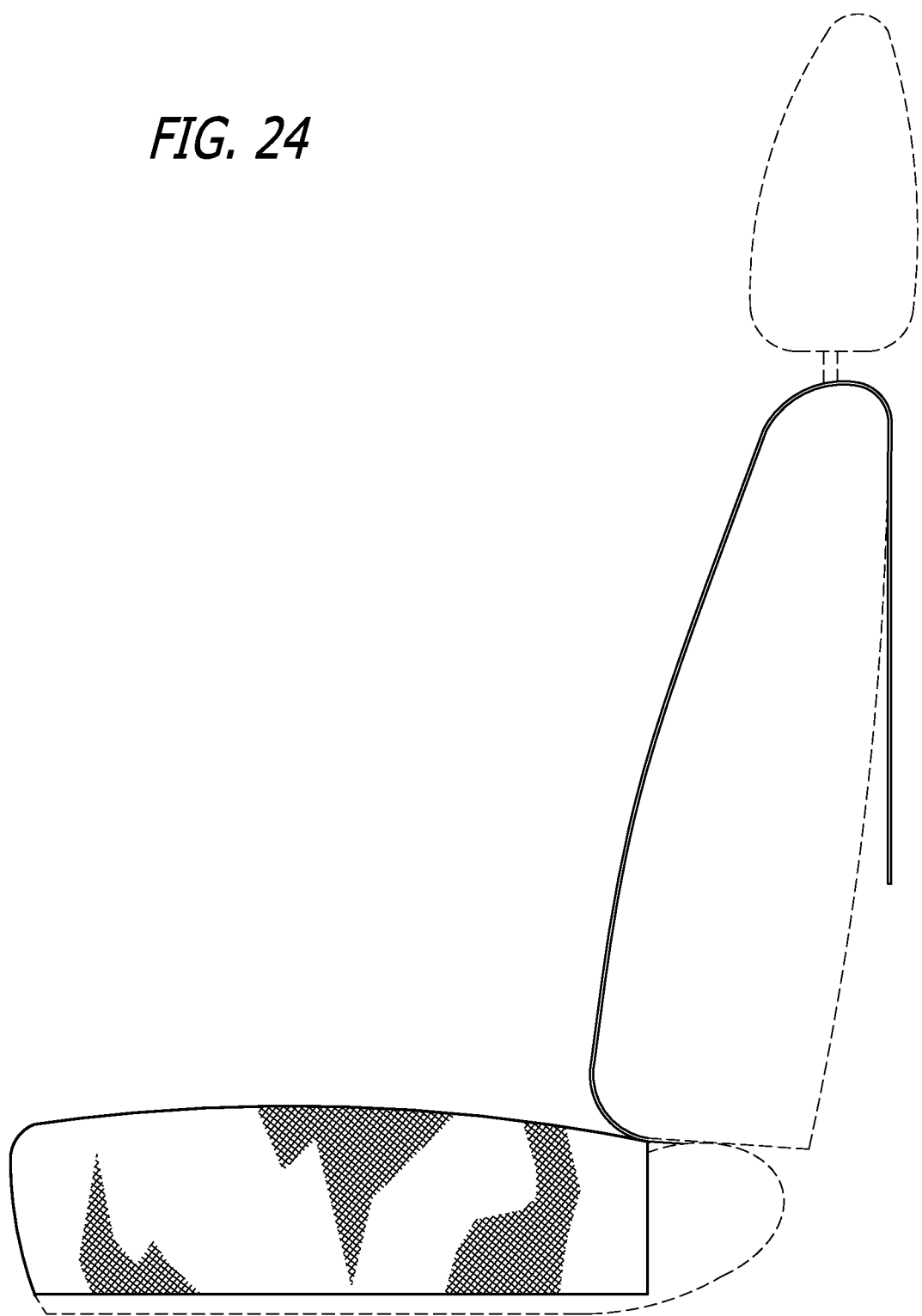
FIG. 24 is a right side elevation view of the second alternate embodiment of the seat cover.
Figure 25:
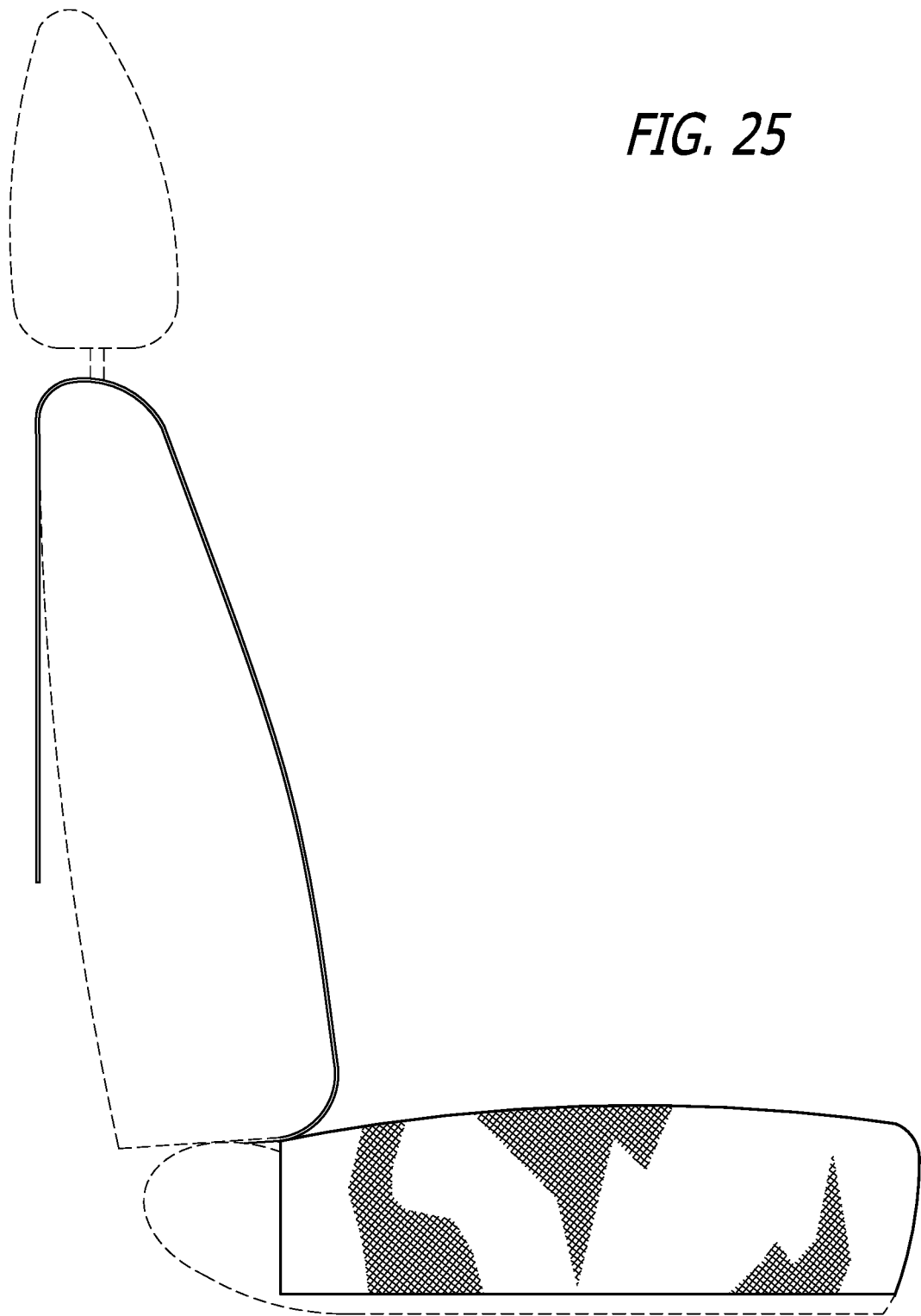
FIG. 25 is a left side elevational view of the second alternate embodiment of the seat cover.
Figure 26:
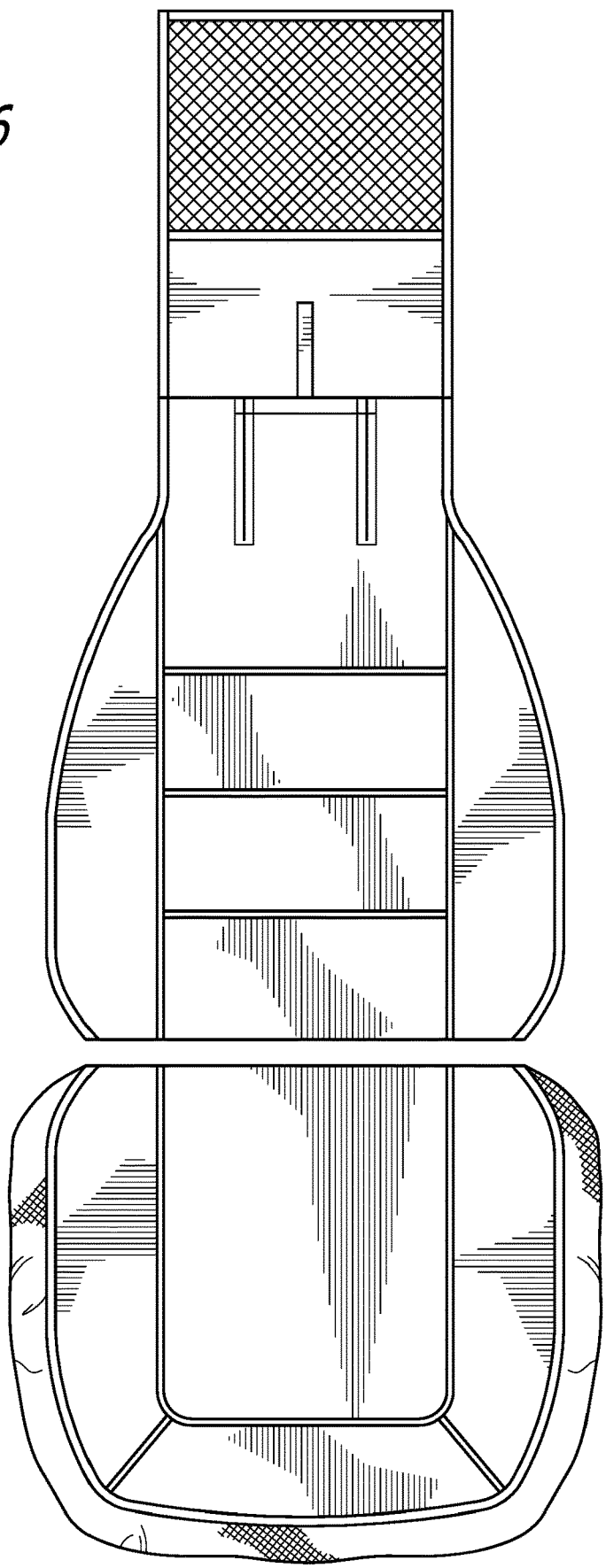
FIG. 26 is a front view of the second alternate embodiment of the seat cover in an unfolded, flat orientation.

FIGS. 20 through 26 illustrate a second alternate embodiment of the present seat cover design. FIG. 20 is a top right perspective view showing the top, front, and right sides of a second alternate embodiment of the seat cover. FIG. 21 is a top left perspective view showing the showing the top, front, and left sides of the second alternate embodiment of the seat cover. FIG. 22 is a left rear perspective view showing the back and a portion of the right side of the second alternate embodiment of the seat cover. FIG. 23 is a right rear perspective view showing the back and a portion of the left side of the second alternate embodiment of the seat cover. FIG. 24 is a right side elevation view of the second alternate embodiment of the seat cover. FIG. 25 is a left side elevational view of the second alternate embodiment of the seat cover, and FIG. 26 is a front view of the second alternate embodiment of the seat cover in an unfolded, flat orientation.

Thus according to a first aspect of the present design, there is provided a seat cover for a seat having a headrest, comprising a backrest cover sized to at least partially cover a backrest of the seat, an opening disposed on the backrest cover sized to allow the headrest to pass therethrough, and a flap sized to cover the opening and that is transitionable between a closed position and an open position. The opening is sized similar to the flap and the backrest cover has a securable slit provided therein. The flap in the open position and the slit in an unsecured orientation enables the seat cover to fit over the headrest, and the flap can be closed under the headrest and the securable slit secured to form a closed orientation.

According to a second aspect, there is provided a seat cover for a seat having a headrest. The seat cover comprises a backrest cover dimensioned to at least partially cover a backrest of the seat, a first opening disposed on the backrest cover comprising a flap dimensioned to cover the first opening, wherein the flap has an open position and a closed position, and a slit disposed on the backrest cover adjacent to the first opening that opens to form a second opening. The first opening and second opening are dimensioned to allow the headrest to pass therethrough when the flap is in the open position and the slit is opened to form the second opening.

According to a third aspect, there is provided a seat cover for use with a backrest of a seat, comprising a backrest cover sized to fit the backrest of the seat, the backrest cover comprising an openable and closable flap, wherein when opened the seat cover includes a flap opening and a slit formed adjacent the flap opening. Opening the flap and the slit enables the seat cover to be installed over a headrest provided with the seat, the flap is closable under the headrest, and the slit is closable.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. A seat cover for a seat having a headrest, comprising:
   a backrest cover dimensioned to at least partially cover a backrest of the seat;
   a first opening disposed on the backrest cover comprising a flap having an open position and a closed position, the first opening defined in part by a horizontal line opening bordered on one side by two vertical slits configured to accommodate two posts joining the headrest to the seat; and
   a further vertical slit disposed on the backrest cover adjacent to the first opening that opens to form a second opening, the further vertical slit when closed joining the horizontal line at a location between the two vertical slits;
   wherein the first opening and second opening are dimensioned to allow the headrest to pass therethrough when the flap is in the open position and the further vertical slit is opened to form the second opening.

2. The seat cover of claim 1, wherein the first opening and flap are rectangular in shape.

3. The seat cover of claim 2, wherein the further vertical slit abuts an edge of the first opening.

4. The seat cover of claim 1, wherein the backrest cover is made of a soft and flexible material.

5. The seat cover of claim 1, further comprising a bottom cover that is dimensioned to at least partially cover a bottom portion of the seat.

6. The seat cover of claim 1, wherein the headrest removably couples with the seat via a first post and a second post separated by a first distance.

7. The seat cover of claim 6, wherein the flap has a width that is substantially equal to or less than the first distance.

8. The seat cover of claim 1, further comprising a hook-and-loop fastener configured to maintain the flap in the closed position.

9. The seat cover of claim 1, further comprising a hook-and-loop fastener configured to maintain the flap in the closed position and a hook-and-loop fastener configured to maintain the slit in a closed position.

10. A seat cover for use with a backrest of a seat, comprising:
    a backrest cover sized to fit the backrest of the seat, the backrest cover comprising:
      an openable and closable flap, wherein when opened the seat cover includes an opening that is rectangular in shape and comprising a horizontal line opening bordered on one side by two vertical slits configured to accommodate two posts joining a headrest to the seat; and
      a further vertical slit located on a second side of the horizontal line and joining the horizontal line at a location between the two vertical slits when the flap is closed;
    wherein opening the flap and the further vertical slit enables the seat cover to be installed over the headrest, the flap is closable under the headrest, and the further vertical slit is closable.

11. The seat cover of claim 10, wherein the flap is rectangular in shape.

12. The seat cover of claim 10, further comprising a bottom cover that is sized to at least partially cover a bottom portion of the seat.

13. The seat cover of claim 10, wherein the headrest removably couples with the seat via two posts, which are separated by a distance.

14. The seat cover of claim 13, wherein the flap has a width that is substantially equal to or less than the first distance.

* * * * *